(12) United States Patent
Harvey et al.

(10) Patent No.: US 8,250,235 B2
(45) Date of Patent: Aug. 21, 2012

(54) METHOD AND SYSTEM FOR PROVIDING SECURE ONE-WAY TRANSFER OF DATA

(75) Inventors: Elaine M. Harvey, Oakton, VA (US); Wayne A. Mitzen, Manassas, VA (US); Jason Wright, Chantilly, VA (US); John M. Sleggs, Leesburg, VA (US); Lawrence A. Wimble, Crystal River, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1589 days.

(21) Appl. No.: 10/848,159

(22) Filed: May 19, 2004

(65) Prior Publication Data

US 2005/0033990 A1    Feb. 10, 2005

Related U.S. Application Data

(60) Provisional application No. 60/471,347, filed on May 19, 2003.

(51) Int. Cl.
*G06F 15/16* (2006.01)
(52) U.S. Cl. .......................... 709/237; 709/215; 709/218
(58) Field of Classification Search .................. 709/225, 709/237, 215, 218; 713/153; 710/1, 316, 710/62
See application file for complete search history.

(56) References Cited

U.S. PATENT DOCUMENTS

| | | | |
|---|---|---|---|
| 4,951,029 A | | 8/1990 | Severson |
| 5,638,521 A * | | 6/1997 | Buchala et al. ............... 710/316 |
| 5,812,793 A | | 9/1998 | Shakib et al. |
| 6,240,471 B1 * | | 5/2001 | Schlueter et al. ............... 710/62 |
| 6,266,710 B1 * | | 7/2001 | Dittmer et al. ..................... 710/1 |
| 6,317,831 B1 | | 11/2001 | King |
| 6,772,332 B1 * | | 8/2004 | Boebert et al. ................. 713/153 |
| 2002/0032865 A1 | | 3/2002 | Golubchik et al. |
| 2002/0108021 A1 | | 8/2002 | Syed et al. |

OTHER PUBLICATIONS

Tenix, "Veto Uni-directional Network Bridge and Data Pump Applications White Paper", UNB and DPA White Paper by Tenix Datagate Pty Ltd, 2002, pp. 1-6.*
"Eclipse Encryptor", Essex Corporation, pp. 1-6, shown at 2004 Navy Opportunity Forum, Reston, VA, May 3-4, 2004.
"Serial Data Regulator: Preliminary Specification", Compucat Research Pty Limited, Oct. 16, 2000 (from http://www.compucatcom.au).
"Interactive Link: Multi Level Information Security", Tenix, available in May 2003 (from http://www.tenix.com/pdflibrary/86.pdf).
"Web Guard—Secure High-to-Low Guard", developed Dec. 2000 (from http://www.eb2b.com.au/pdf/products/webguard.pdf).
"SecureOffice WebShield", Trusted Computer Solutions (from http://www.tcs-sec.com/products/pdfs/TrustedWebShield.pdf).
Hubbard, Brian, "Operationalizing of Multi-Level Security aka. Guarding Solutions: Cross-Domain Solutions", presented at Eighteenth ACSAC, Las Vegas, NV, Dec. 12, 2002.

(Continued)

*Primary Examiner* — Le Luu

(57) ABSTRACT

A system including a transmitter, a receiver, and a conduit is provided. The transmitter is within a first network, and is in communication with at least one other device within the first network. The receiver is within a second network, and is in communication with at least one other device within the second network. The conduit is formed between the transmitter and the receiver, and is capable of carrying a signal transmitted from the transmitter to the receiver. To maintain the unidirectional nature of the conduit, either the transmitter is incapable of receiving any signal via the conduit or the receiver is incapable of transmitting any signal via the conduit.

29 Claims, 13 Drawing Sheets

OTHER PUBLICATIONS

"The MLS Environment", Section 3, available at http://nsi.org/Library/Compsec/sec3.html.

Foreman, E. A., "Common Criteria Evaluation and Validation Scheme Validation Report: Data Diode Version 1 and Data Diode Version 2", National Information Assurance Partnership, v. 1.0, Nov. 19, 2002.

Walter, R. E., "COSPO Watch: COSPO's New One-Way Transfer", Open Source Publishing, Inc., May 7, 2004, available at http://www.osint.org/oso/v2n2/cospo.htm.

Landwehr, C. E., "Architecture and Components for Data Management Security: NRL Perspective", Naval Research Laboratory, presented at 1997 National Information Systems Security Conference, Baltimore, MD, Oct. 7-10,1997.

Westmacott J., "Unidirectional Networking: GIAC Security Essential Certification Practical Assignment Version 1.4b", SANS Institute, 2003.

Kang, M. H. et al: "Design and Assurance Strategy for the NRL Pump", Computer, IEEE Service Center, Los Alamitos, CA, US, vol. 31, No. 4, Apr. 1998, pp. 56-60, XP000742615 ISSN: 0018-9162.

Moore, Andrew P.: "Network Pump (NP) Security Target", Naval Research Laboratory Washington DC 20375-5320, [Online] May 29, 2000, pp. 1-54, XP007904122, Internet, Retrieved from the Internet: URL : http://chacs.nrl.navy.mil/publications/CHACS/2000/2000moore-NPST.pdf.

Kang et al., "A Network Pump", IEEE Transactions on Software Engineering, IEEE Service Center, Los Alamitos, CA US, vol. 22, No. 5, May 1, 1996, pp. 329-333.

Kang M H et al: "An architecture for multilevel secure interoperability" Computer Security Applications Conference. 1997. Proceedings • 13TH Annual San Diego. CA. USA Dec. 8-12, 1997. Los Alamitos. CA. USA.IEEE Comput. Soc. US. Dec. 9, 1997 (Dec. 9, 1997). pp. 194-204.

Davidson J A: "Asymmetric isolation" Computer Security Applications Conference. 1996 • 12TH Annual San Diego. CA. USA Dec. 9-13, 1996. Los Alamitos. CA. USA. IEEE Comput. Soc. US. Dec. 9, 1996 (Dec. 9, 1996). pp. 44-54.

\* cited by examiner

METHOD AND SYSTEM FOR PROVIDING SECURE ONE-WAY TRANSFER OF DATA

PRIORITY APPLICATION

This application claims the benefit of U.S. Provisional Application No. 60/471,347, filed on May 19, 2003.

FIELD OF THE INVENTION

The invention relates to network security. More specifically, the invention relates to network security provided by a secure one-way data transfer mechanism.

BACKGROUND

As the use of computers and computer networks has increased dramatically in recent years, so too have concerns regarding the security of information stored on and transmitted between computer devices.

One problem commonly encountered is the problem of providing network security for networks that contain sensitive or otherwise confidential data. A challenge occurs, for example, when multiple networks or sub-networks having different levels of security are interconnected. In the case of private entities that interact with government agencies, for example, government agencies may wish to only transmit or receive information to or from the private entities without allowing these entities direct, two-way access to sensitive networks or network devices. Safeguards placed within sensitive networks (e.g., government networks, corporate networks, etc.), can be used to provide a security boundary that prevents outside access to internal networks, and maintains a zone of integrity, where all information is known to be secret, sanitized, and authentic. Such zones of integrity are sometimes referred to, for example, as demilitarized zones (DMZs). Transmitting data across network boundaries (e.g., between networks having different levels of security) is a sensitive task for which appropriately secure mechanisms must be employed.

In the past, systems have generally focused on two-way data transfers, and maintaining the integrity of two-way data communications channels, such as in commercial applications on the Internet, including secure socket layer (SSL) communications, and other techniques, for example. Because of the security requirements for some network security boundaries, however, a mechanism that can ensure a one-way transfer of data across such boundaries is often desirable.

Some prior systems that intend to maintain the integrity of a network use software applications to control devices that are capable of bidirectional communications for providing only a one-way data channel between networks. Such systems can, for example, use devices with both transmit and receive capabilities, but only process data either for a transmitter or from a receiver. Other such systems may, for example, allow two one-way communications channels to be established by a bidirectional capable device: one for transmitting data and one for receiving data. Still other approaches attempt to fool or "spoof" devices into believing they are engaged in two-way communications with another device across a security boundary, when they are actually only transmitting data to or receiving data from that device.

In the context of wireless communications and wireless data transfer, security over one-way data paths has been addressed in a limited context. For example, U.S. Pat. No. 6,317,831 to King entitled, "Method and Apparatus for Establishing a Secure Connection over a One-Way Data Path," discloses performing cryptographic handshake operations for a one-way data channel over a companion two-way data channel to satisfy security protocols that require two-way communications for such operations.

Each of the prior approaches has the inherent security risks of the possible flow of data in an undesired direction. In some applications, such as communications across government network security boundaries, communications across sensitive corporate network security boundaries, or other communications across similarly sensitive network security boundaries, using a two-way data channel of any type, or any devices capable of two-way communication is undesirable and/or unacceptable. In such sensitive contexts, a two-way channel, or even the ability to establish such a two-way channel, can pose an unacceptable security risk or data integrity risk.

Accordingly, it would be desirable to develop a mechanism for one-way transfer of data that does not pose the security and data integrity risks associated with prior approaches. Such a method and system should be simple to employ within existing network architectures and protocols, and should provide a high-speed, guaranteed one-way transfer mechanism that permits one-way streaming of high-bandwidth data.

SUMMARY

The present invention, according to its various embodiments, is a system and method for providing secure one-way transfer of data. One or more embodiments of the invention are simple to employ within existing network architectures and protocols, and provide a high-speed, guaranteed one-way transfer of data over across a network boundary. Additionally, one or more embodiments of the invention permit one-way streaming of high-bandwidth data.

A system is provided, according to an embodiment of the invention, which includes a transmitter, a receiver, and a conduit. The transmitter is within a first network, and is in communication with at least one other device within the first network. The receiver is within a second network, and is in communication with at least one other device within the second network. The conduit is formed between the transmitter and the receiver, and is capable of carrying a signal transmitted from the transmitter to the receiver. The transmitter is incapable of receiving any signal via the conduit and/or the receiver is incapable of transmitting any signal via the conduit.

A method is provided, according to an embodiment of the invention, which establishes a conduit between source network and a target network, which allows a data signal to be transmitted from the source network to the target network. The method renders physically impossible receipt of any signal at the source network via the conduit. Additionally or alternatively, the method renders physically impossible transmission of any signal from the target network. The method also transmits a data signal from the source network to the target network via a conduit.

Further features of the invention, and the advantages offered thereby, are explained in greater detail hereinafter with reference to specific embodiments illustrated in the accompanying drawings, wherein like elements are indicated by like reference designators.

DETAILED DESCRIPTION

Figure 1:
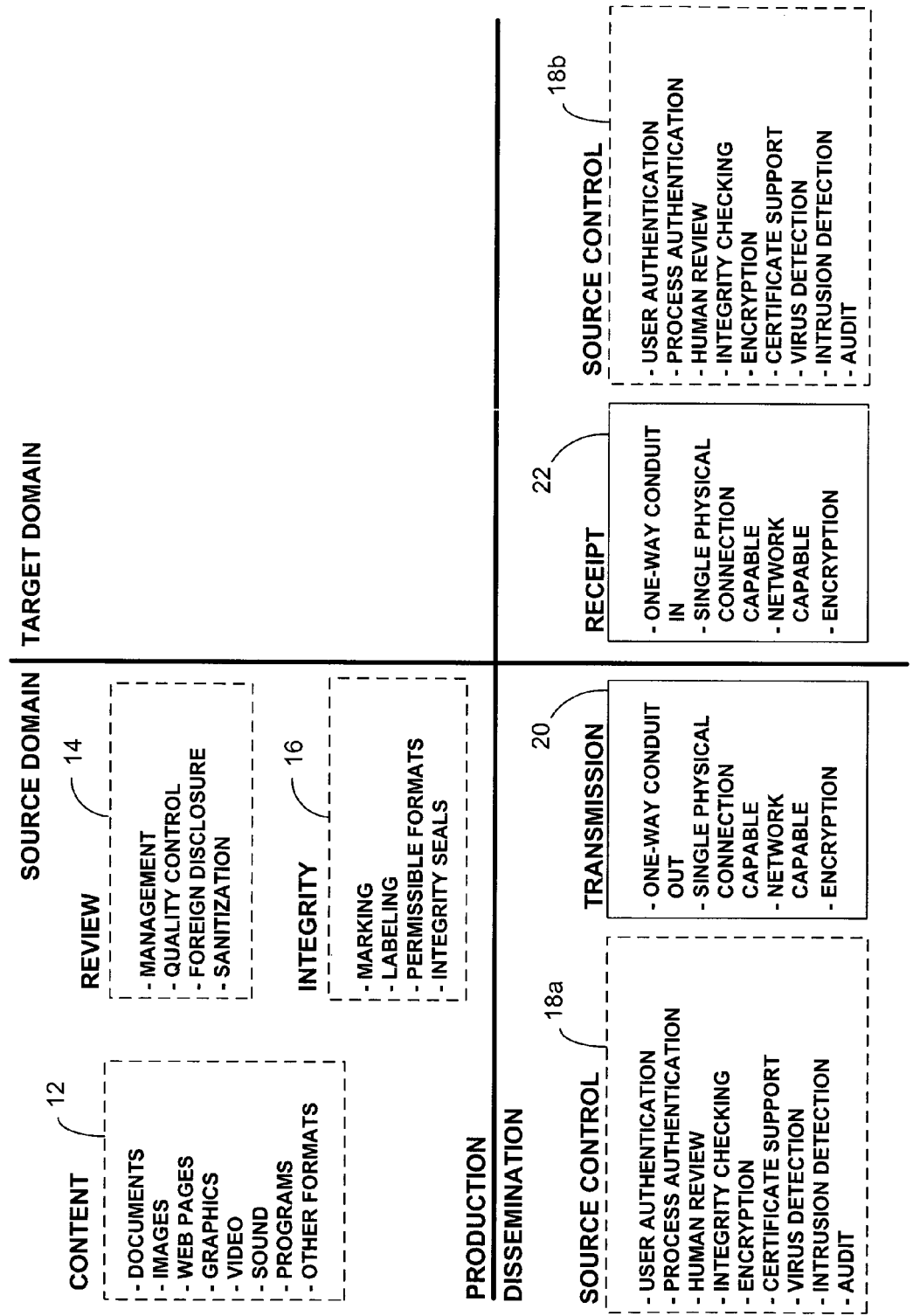
FIG. 1 is a block diagram showing various aspects of maintaining the integrity and security of data while moving information from a source domain to a target domain.

A method and system for providing secure one-way transfer of data are described. To facilitate an understanding of the principles and features of the invention, it is explained hereinafter with reference to its implementation in one or more illustrative embodiments. The invention, however, is not limited to the described illustrative embodiments. Rather, the invention can find wherever a secure one-way transfer of data is desired.

According to one or more embodiments of the invention, secure one-way transfer of data between devices is provided. More specifically, a mechanism is provided that either transmits or receives unidirectionally across a network boundary (e.g., a network security boundary). This is accomplished by forming a one-way, or unidirectional, conduit between two unidirectional devices on opposite sides of a network boundary. For example, by way of a one-way conduit, or communications channel, a transmitter can transmit a data signal to a receiver on the other side of the network boundary, but is unable to receive any transmissions from the other side of the network boundary. Additionally or alternatively, a receiver can receive information across a network boundary via the unidirectional conduit, but is unable to transmit any data signal across the network boundary. Thus, networks containing sensitive information, or networks requiring high security (often referred to as "high networks"), such as government networks, corporate networks, and so forth, can use such a unidirectional transmitter or unidirectional receiver to either transmit or receive data signals across a network boundary, without fear of data signals flowing across the network boundary in an unintended and/or undesirable direction.

According to an embodiment of the invention, a transmitter (sometimes designated as TX) within a source network, or source domain, communicates with various devices within the source network, and is the only point of contact between devices within the source network and devices outside of the source network via a conduit between the source network and a target network, or target domain (which can also be referred to as a destination network or destination domain). The transmitter is a unidirectional transmitter, in that via the unidirectional conduit across the source network boundary, it can only transmit and is incapable of receiving data signals from any devices outside of the source network, or via the one-way conduit. A receiver (sometimes designated as RX) within the target network receives signals transmitted via the unidirectional conduit and communicates them to devices within the target network. The receiver is also a unidirectional device that is not capable of transmitting any data signal to a device outside of the target network via the unidirectional conduit.

By using a transmitter and/or receiver that is capable only of unidirectional communication across a network boundary (e.g., via a unidirectional conduit), there is no danger that data signals might travel in an unintended and/or an undesirable direction across a network boundary. Indeed, according to various embodiments of the invention, each of the transmitter and receiver can be used independently, without requiring that the device on the other side of the network boundary connected to the unidirectional conduit be unidirectional, because each of the transmitter and receiver devices described above is physically capable only of communication of data signals in a single direction.

According to one or more embodiments of the invention, the devices within the source network and the target network can communicate using a number of suitable communication protocols, such as transmission control protocol (TCP), internet protocol (IP), simple network management protocol (SNMP) or the like. The transmitter and/or receiver connected to the conduit by which the two networks communicate can act as a gateway between the two networks, and can appear as transparent to the various devices within the respective networks. Thus, for example, the devices within the source network can communicate via the conduit with devices in the target network, without knowing of the one-way conduit, the transmitter, and/or the receiver.

For example, devices within the source network can transmit signals intended for devices within the target network that are received by the transmitter. These signals can then be passed, via the unidirectional conduit to the receiver in the target network, and can be subsequently communicated to the originally intended target device.

In communicating between the two networks, or across a network boundary, the transmitter can repackage the data to be transmitted according to a number of suitable protocols, such as, TCP, IP, user datagram protocol (UDP), or other suitable protocols. Additionally, the transmitter can add one or more security measures, such as encryption, checksums, hashes digital signatures, digital certificates, or other measures to ensure the security and/or integrity of the data being transmitted via the unidirectional conduit. The receiver in the target network can receive and unpackage the data, which then can be transmitted to devices (e.g., the originally intended target device) within the target network using the original protocol or another protocol (e.g., TCP, IP, etc.). By using the unidirectional transmitter and/or receiver to communicate via a unidirectional conduit, embodiments of the invention provide a secure, one-way mechanism for transferring data.

Because at least one of the transmitter and/or receiver are physically incapable of establishing two-way communications with devices outside of their respective network, they are suitable for even the most stringent security requirements, such as those used in various government applications and/or commercial applications. For example, one or more embodiments of the invention can be certified as meeting interoperability for sensitive networks, such as secret and below interoperability (SABI) and top secret/SCI and below interoperability (TSABI). Additionally, one or more embodiments of the invention can meet certifications for providing support to secret, top secret, SCI, "5-eyes" secret, and/or "5-eyes" SCI classified networks.

By providing a secure, one-way mechanism for transferring data, embodiments of the invention can be highly rated in the evaluation assurance level (EAL) system, which is part of the "Common Criteria" (CC) developed by and accepted by multiple governments and other organizations as an international standard for security specifications and evaluations. Because of the ability of one or more embodiments of the invention to obtain a high evaluation assurance level, and because transmitters and/or receivers developed according to embodiments of the invention are compatible with standard communications protocols, such devices can be readily implemented in standard systems to provide high levels of security to those systems without any special adaptation of the standard systems.

Additionally, one or more embodiments of the invention can meet sharing requirements for sensitive networks (e.g., between security domains, bilateral allies, coalitions, etc.), such as the "Command, Control, Communications, Computers, Intelligence, Surveillance, Reconnaissance" (C4ISR) requirements. C4ISR requires a high-assurance, certifiable technology that is capable of meeting high performance standards, such as embodiments of the invention provide. For example, the C4ISR requirements include the ability to provide streaming audio, video, tracking, and other capabilities. Additionally, the C4ISR requirements include the ability to provide file-based text, images, graphics, geospatial information, and so forth. One or more embodiments of the invention provide a system and method that meet the C4ISR requirements.

According to one or more embodiments of the invention, a high-security network (sometimes referred to as a "high network") can receive data from a comparatively lower-security network (sometimes referred to as a "low network") without any risk of any data being transferred outside of the high network (e.g., to the low network or otherwise) by using a unidirectional receiver to establish a unidirectional conduit. The unidirectional conduit is established over a single physical connection, and is the only conduit between the high network and the low network. The receiver is incapable of transmitting any signals via the conduit (or via the single physical connection) and, therefore, there is no possibility of dissemination of information from the high network to the low network.

FIG. 1 is a block diagram showing various aspects of maintaining the integrity and security of data while moving information from a source domain, or source network, to a target domain or target network. The aspects shown in FIG. 1 represent common considerations for the security and integrity of data during such transmissions. Some procedures for maintaining the integrity and security of data are implemented during a production phase (shown in the upper half of the figure), prior to transmission of the data. Other aspects shown in FIG. 1 occur during dissemination of the data (shown in the lower half of the figure), or during the moving of data from the source domain to target domain.

During the production phase shown in FIG. 1, which is accomplished within the source domain, restrictions on the type of content 12 permitted to be disseminated can be implemented. For example, various types of content, such as documents, images, web pages, graphics, video, sound, programs, and/or other formats can be either allowed or disallowed for dissemination from the source network (e.g., across the source network boundary). The determination of what is allowed or not allowed to be disseminated across the source network boundary can be made, for example, according to a network security policy.

Once it is determined that certain allowed content from the content 12 is to be transmitted from the source network to the target network, a review 14 of that allowed content can be implemented. Such a review 14 of the content 12 can be implemented, for example, using various management techniques, quality control techniques, and/or sanitation techniques. Additionally, safeguards can be specified for avoiding any unwanted foreign disclosure of permissible or disallowed content 12. In addition to a review 14 of the content 12, the integrity 16 of the allowed content can be managed by various techniques. For example, the allowed content can be marked, labeled, placed into formats allowed to be transmitted between networks, and/or have integrity seals applied thereto.

Once the allowed content from the content 12 has been prepared for dissemination in the production phase, the source control 18a can be used to control and/or verify the source of the allowed content being transmitted. For example, user and/or process authentication can be used to authenticate the user and/or process attempting to disseminate the allowed content from the content 12. Additionally, a human review can be implemented, integrity checking can be used, or other similar techniques can be used for verifying the review 14 and/or integrity 16 of the allowed content from the content 12 prior to dissemination. Additionally, the security of the data can be assured by way of encryption, certificate support (e.g., support for digital certificates), digital signatures and/or other techniques. Moreover, such techniques as virus detection, intrusion detection, and/or auditing techniques can be used to control the source of the content 12 during dissemination from the source network to the target network.

Once the activities of the source control 18a have operated on the allowed content from the content 12, the allowed content is prepared for transmission and transmitted. During transmission 20, according to one or more embodiments of the invention, various steps are taken to ensure that the only data signals that move across the network security barrier between the source network and the target network are data signals that are intended to be disseminated. This is accomplished, according to one or more embodiments of the invention, by a one-way conduit that is capable of transmitting data, but incapable of receiving data from the target network, or any other device outside of the source network. Additionally, there is only a single physical connection between the source network and the target network, upon which the one-way conduit is carried. The conduit is a logical connection between the networks and, although it can include multiple sockets, or "virtual conduits," it is the only logical connection between the networks. The single physical connection can be made resistant to interference, as can the transmitter configured to transmit via the conduit. The data transmitted from the source network can be configured as network capable, and can employ encryption to maintain the security of the data.

In the target network, the data is received 22 using a one-way conduit over which data flow cannot be reversed, as discussed above. Similar to transmission 20 of the data, the receipt 22 of the data is also performed using similar constraints. The receipt 22 of the data, therefore, only occurs via the single physical connection between the source network and the target network. Thus, data cannot be transmitted from the target network to the source network, and data cannot be received by the target network from any source other than devices within the source network. Source control 18b can also be used in the target network, in a similar manner as described in connection with the source control 18*a* performed in the source network.

One or more embodiments of the invention provide the transmission 20 and receipt 22 capabilities described in connection with FIG. 1. Depending upon the desired implementation, either the transmission 20 or receipt 22 capabilities can be implemented using a bidirectional device, as long as the other device is a unidirectional device only, which is incapable of reversing the flow of data over the unidirectional conduit. Additionally, one or more embodiments of the invention enable the source control 18*a*, 18*b* in the source network and/or target network, according to the needs of those specific networks.

As discussed above, prior systems attempted to accomplish one-way communication using devices capable of communicating bidirectionally. These prior approaches used software and/or hardware means (e.g., intentional spoofing) to cause bidirectional devices into communicating in only one direction. Thus, the conduit between the networks, or across a network boundary, was not strictly unidirectional, because the devices were capable of reversing the flow of data.

Figure 2:
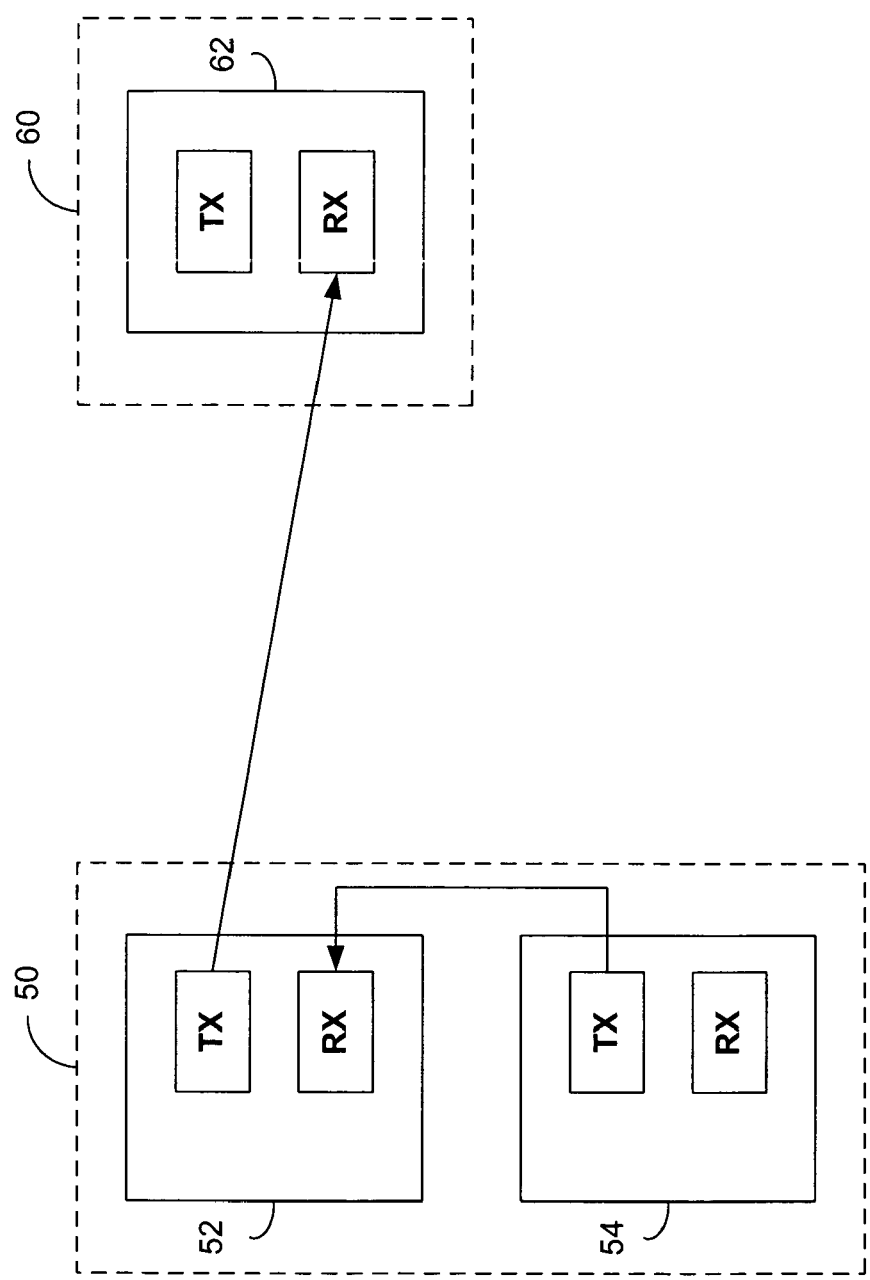
FIG. 2 is a block diagram of a prior approach for spoofing a transceiver into performing as a unidirectional transmitter.

FIG. 2 is a block diagram of a prior approach for intentionally spoofing a transceiver into performing as a unidirectional transmitter. The technique shown in FIG. 2 is a hardware technique that can be imitated using software. In FIG. 2, devices 52, 54, 62 are shown within two networks 50, 60. Each of the devices, 52, 54 within the source network 50 are standard communication devices that are capable of both transmitting and receiving (i.e., they are transceivers), by way of a transmitter TX and a receiver RX, respectively. Because many network communication protocols are two-way protocols, and because most communication devices support both transmission and receipt of communication data signals, establishing a one-way flow of data to communicate between the networks 50, 60 can be difficult. For example, if a device 52 from the source network 50 is intended to transmit data signals to a device 62 within the target network 60, but not receive any signals therefrom, it must be intentionally "spoofed" into believing that it is both transmitting and receiving data according to the two-way protocol by which it communicates.

As shown in FIG. 2, prior approaches accomplished this intentional "spoofing" by connecting the transmitter TX of a second device 54 within the source network 50 to the receiver RX of the first device 52, and providing a control signal from the transmitter TX of the second device 54 to the receiver RX of the first device 52. This can, however, present security risks. For example, because the first device 52 within the source network 50 that is connected to the device 62 outside of the source network 50 is physically capable of receiving data, it is possible that the first device 52 within the source network 50 could unintentionally receive unwanted data. For example, if the first device 52 were somehow incorrectly connected (either intentionally or accidentally) such that the receiver RX of the first device 52 is connected with the device 62 outside of the source network 50, then unwanted data could be received within the first network. Therefore, any security accreditation of the one-way transmission accomplished by the system of devices 52, 54 within the source network 50 would have to be accomplished on an individual basis, because the security and integrity of such a connection is implementation specific. However, even if a desired accreditation level is achieved using the spoofing configuration shown in FIG. 2, there is no guarantee that that configuration will remain after the accreditation, and thus, the one-way connection cannot be assured to prevent data from moving across a network boundary in a direction that is either unintended or unacceptable.

Figure 3:
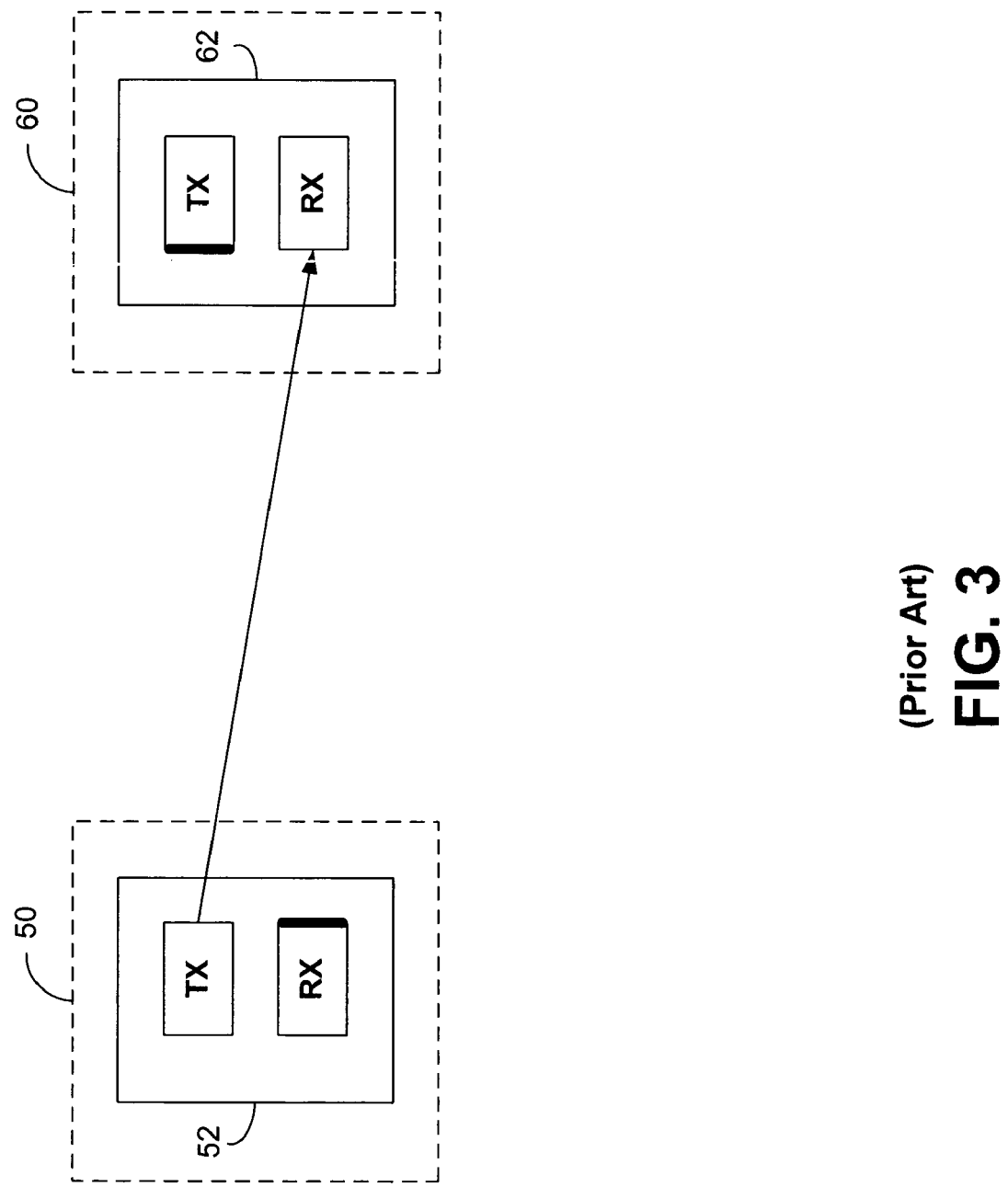
FIG. 3 is a block diagram of a prior approach for causing a transceiver to perform as a unidirectional transmitter or receiver.

FIG. 3 is a block diagram of a prior approach for causing a transceiver to perform as a unidirectional transmitter or receiver. As with FIG. 2, the configuration shown in FIG. 3 includes a source network 50 and a target network 60. Devices 52, 62, within the source network 50 and target network 60, respectively, are standard communication devices that are configured to both transmit and receive data signals. Using the approach illustrated in FIG. 3, the receiver RX of the device 52 within the source network 50 and the transmitter TX of the device 62 in the target network 60 are disabled using a physical impediment of some type. For example, this may include disabling pins on a communications port (e.g., by removing, blocking, or otherwise preventing access to the pins that correspond to the transmit or receive functions). However, as with the approach shown in FIG. 2, the approach shown in FIG. 3 suffers from the difficulty of assuring the integrity of a one-way data transmission across a network boundary because the possibility exists for access to be restored to the receiver of the device 52 in the source network 50 and/or the transmitter of the device 62 within the target network 60. For example, if pins are removed, they could be replaced, or if pins are physically blocked, they can be unblocked, such that access is restored, and two-way communication is again possible.

Figure 4:
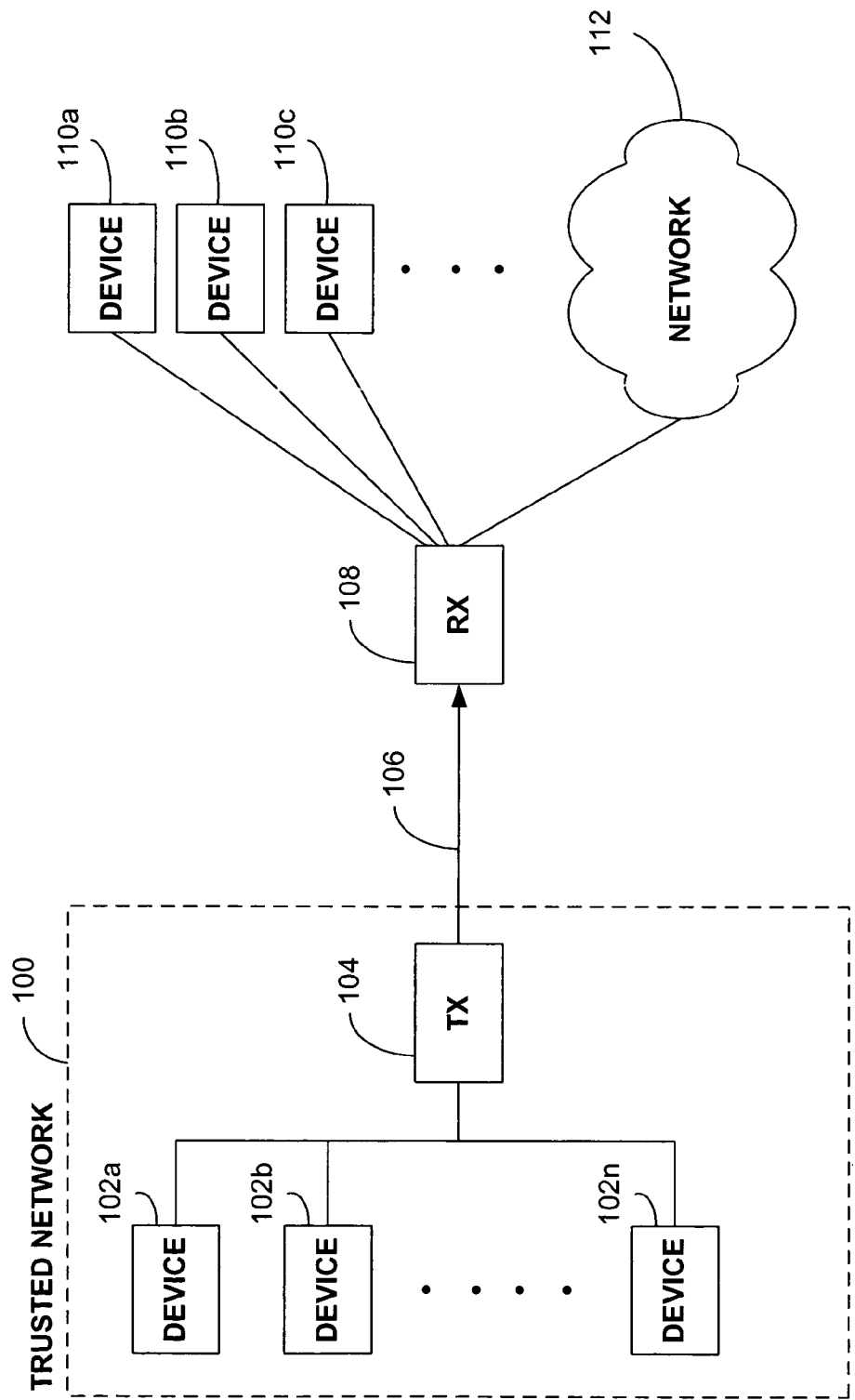
FIG. 4 is a block diagram illustrating a one-way transfer according to an embodiment of the invention.

FIG. 4 is a block diagram illustrating a one-way transfer according to an embodiment of the invention. In FIG. 4, a trusted network 100 can include multiple devices 102*a*, 102*b*, . . . 102*n* (or generally "102"), which are interconnected. These devices 102 can communicate using a variety of suitable network communication protocols, such as TCP, IP, SNMP, or other similar protocols. The trusted network 100 can comprise, for example, a government network that requires a certain level of security to access, or other network having similar security requirements (e.g., security clearance level, etc.). The trusted network 100 can also represent a de-militarized zone (DMZ) that is connected to one or more devices outside of the trusted network 100. The trusted network 100 can also comprise a commercial network containing sensitive data, such as a corporate network or the like.

Because of the sensitivity of the devices 102 and/or data either stored on or transmitted between those devices 102 within the trusted network 100, it may be desirable to guard against attacks from outside the trusted network 100 on the devices 102 or data within the trusted network 100. It may also be desirable, however, to electronically transmit select data from the trusted network 100 across a network boundary to devices outside of the trusted network 100.

To allow such transmissions while protecting the sensitive data and/or devices of the trusted network, a unidirectional transmitter 104 (also designated TX) can be used to establish a unidirectional conduit with a device outside of the trusted network 100 (i.e., across the security boundary of the trusted network 100). The transmitter 104 can, therefore, receive data from each of the devices 102 within the trusted network 100. The unidirectional transmitter 104 has a single physical connection 106 to a device outside of the trusted network 100. The transmitter 104 can only transmit, and is incapable of receiving any signals, by way of that single physical connection 106. Thus, the device to which the transmitter 104 communicates via the single physical connection 106 can be either a dedicated receiver 108, as shown in FIG. 4, or a transceiver which is capable of transmitting and receiving data, because the transmitter 104 is physically incapable of receiving any signals via the single physical connection 106.

As shown in FIG. 4, the receiver 108 can be connected to one or more devices 110a, 110b, 110c. Additionally, the receiver 108 can be connected to a network 112, which may be a public network, such as the Internet, or the like, by which the data transmitted from the transmitter 104 to the receiver 108 can be disseminated to multiple devices. It will be understood that, although no devices are shown connected to the network 112 in FIG. 4, the network can include or otherwise be connected to multiple devices, similar to the devices 110 connected directly to the receiver 108.

The configuration illustrated in FIG. 4 is useful in multiple scenarios. For example, in a commercial embodiment, where a corporation maintains a trusted network 100 and desires to transmit data to one or more devices (e.g. including databases) to multiple customers by way of a public network 112, but wants to protect the sensitive nature of the data and/or the integrity of the data within the trusted network 100, a one-way conduit for communicating from the transmitter 104 to a device, such as a receiver 108, outside of the trusted network 100 can be established.

Thus, for example, a corporation could electronically transmit product information, sales information, catalog data, company directory information, or other similar information that the company desires to transmit outside of the trusted network 100 without fear of unwittingly granting access to the source, and having the source data possibly becoming corrupted. Therefore, the configuration shown in FIG. 4 can safely replace manual distribution of information that the company wishes to distribute, which had previously only been distributed by physical means because of a fear of malicious forces accessing the data and violating the integrity of the data within the trusted network 100.

Figure 5:
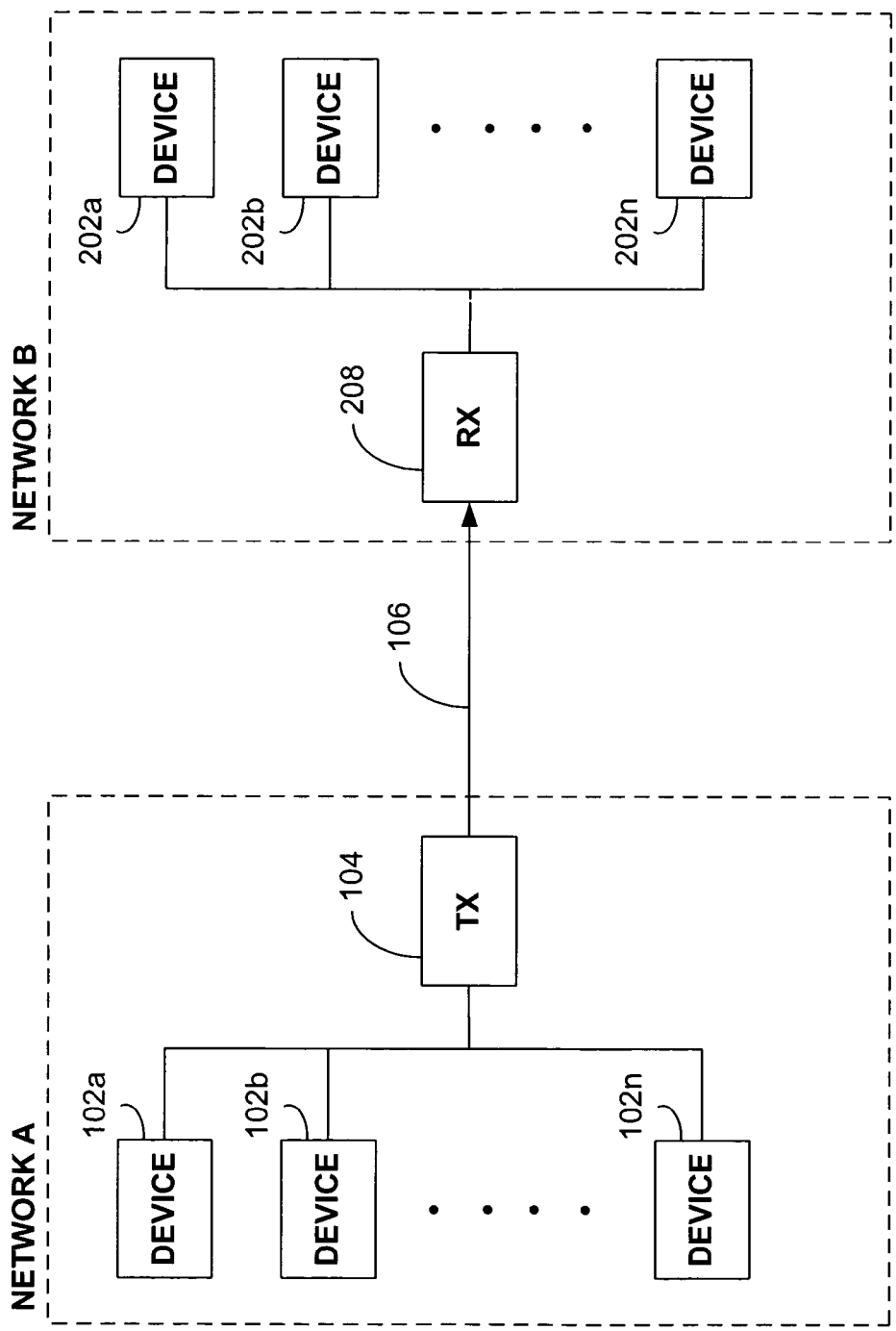
FIG. 5 is a block diagram illustrating a one-way transfer according to an embodiment of the invention.

FIG. 5 is a block diagram illustrating a one-way transfer according to an embodiment of the invention. In FIG. 5, two networks, Network A and Network B are shown. Each of the networks includes one or more devices. The devices in Network A are labeled 102a, 102b, . . . , 102n (or generally "102"), while the devices in Network B are labeled 202a, 202b, . . . , 202n (or generally "202"). There is a single physical connection 106 between the two networks, by which the transmitter 104 (also designated TX) and the receiver 208 (also designated RX) communicate using a unidirectional conduit. (The unidirectional conduit is established between the transmitter 104 and the receiver 208, and is carried by a single physical connection.)

The transmitter 104 is a unidirectional transmitter, and is physically incapable of receiving any signal via the conduit established over the single physical connection 106. In other words, the transmitter is physically incapable of receiving any communications from outside of Network A, whatsoever. Similarly, the receiver 208 is a unidirectional receiver, which is physically incapable of transmitting any signal by way of the single, physical connection 106. In other words, the receiver 208 is physically incapable of transmitting any signal outside of Network B.

The devices 102, 202 of Network A and Network B, respectively, can communicate using a variety of common network communication protocols, including protocols such as TCP, IP, SNMP, etc. These devices can be various processor devices, such as standard computer workstations, personal computers, database devices, or other devices suitable for communicating using a communications protocol within the respective network within which it is employed.

According to one or more embodiments of the invention, the single physical connection 106 between Network A and Network B can be an optical fiber. Thus, the transmitter 104 can be configured to establish a conduit with the receiver 208 using photons, to optically transmit data encoded using those photons. A connection using optical fiber is advantageous, as the optical fiber is unaffected by electromagnetic interference (EMI), or other forms of interference typically used to interfere with communications. Additionally, communicating via optical fiber allows for extremely high bandwidth communications between the transmitter 104 and the receiver 208. Thus, the maximum amount of data possible can be communicated between the two networks.

Moreover, an optical fiber connection, used according to one or more embodiments of the invention, can facilitate a high data throughput, in the range of approximately 155-300 Mbps when a single conduit is used, and in the range of approximately 1 Gbps when multiple virtual conduits are used (as discussed below, for example, in connection with FIG. 10). Because of the capability for such high throughput, the conduit established according to embodiments of the invention is capable of high-speed data streaming across a network boundary. Data can be streamed, for example, using file-by-file transfer techniques, such as standard, web-based techniques, or using kernel-level bridging.

According to one or more embodiments of the invention, the devices 102 of Network A can communicate data intended to be communicated to one or more devices 202 within Network B via the conduit established between the transmitter 104 and the receiver 208 over the single physical connection 106. For example, according to one or more embodiments of the invention, the devices 102 of Network A can communicate using a unidirectional protocol, such as IP, or a bidirectional protocol, such as TCP. Data intended for a device 202 in Network B, or otherwise outside of Network A can be communicated to the transmitter 104 using the protocol implemented within Network A.

If the devices 102 of Network A communicate using a bidirectional protocol, for example, the transmitter 104 can act as a unidirectional gateway, or proxy server, for the data path between Network A and Network B, either with or without the knowledge of the devices 102 of Network A. For example, to provide a gateway between Network A and Network B in a manner that is transparent to the devices 102 of Network A while those devices are using a bidirectional protocol, the transmitter 104 can provide acknowledgment signal of the various data packets received by the transmitter 104. The transmitter can then transmit the received data to Network B, which subsequently distributes the data to the intended target device 202 within Network B. For example, in the case of TCP being used by the devices 102 in Network A, the transmitter 104 can acknowledge each of the TCP data packets received from the devices 102 of Network A. The transmitter can then transmit those TCP data packets to the receiver 208, which distributes the TCP data packets to the intended target device 202 within Network B.

The devices 202 within Network B, if they are communicating using the same bidirectional protocol (e.g., TCP, etc.), can acknowledge receipt of the packets to the receiver 208, while believing that they are acknowledging receipt to the source device 102 in Network A. In this manner, neither the devices 102 of Network A, nor the devices 202 of Network B are aware of the presence of the transmitter 104, the receiver 208, or the conduit established between those devices over the single physical connection 106.

Similarly, if the devices 102 of Network A communicate using a unidirectional protocol (e.g., IP), they can transmit data to the transmitter 104, which in turn transmits the data to the receiver 208 of Network B. The receiver 208 then distributes the data to the target device 202 within Network B as if it came directly from the source device 102 in Network A. Thus, using a unidirectional protocol, neither the source device 102 in Network A, nor the target device 202 receiving data in Network B is aware of the transmitter 104, the receiver 208, or the conduit established between those devices using the single physical connection 106.

According to one or more embodiments of the invention, the devices 102 of Network A communicate using TCP, as do the devices 202 of Network B. When the devices 102 of Network A transmit data intended for a device 202 in Network B, that data is received by transmitter 104, unbeknownst to the source device 102 of Network A. The transmitter 104 acknowledges each of the TCP packets received from the source device 102, as if those packets were received by the target device 202, thereby making the transmitter 104 transparent to the source device 102 of Network A. The transmitter 104 then repackages the data using a different protocol (e.g., a unidirectional protocol), for transmission via the conduit established over the single, physical connection 106. According to an embodiment of the invention, the transmitter 104 packages the data received from the devices 102 using the user datagram protocol (UDP).

Additionally, further security measures can be added to the data, such as encrypting the data by the transmitter 104, performing a hash function on the data, transmitting a digital signature, checksum, and/or digital certificate via the conduit, or other similar measures. Moreover, the transmitter 104 can be configured to provide additional data integrity checks, such as a "dirty word" search, strong authentication, or other desired operations.

The transmitter 104 then transmits the data packaged according to the second protocol (e.g., UDP) optically via a conduit established over a single optical fiber physical connection 106 to the receiver. The receiver 208 receives the data and, if necessary, decrypts it and/or verifies (e.g., by way of a comparison) the received data with a digital signature, checksum, and/or digital certificate transmitted by the transmitter 104. The data then is communicated to the target device 202 within Network B using the original bidirectional protocol (e.g., TCP). When the device 202 receives the data, it transmits an acknowledgment signal to the receiver 208, which can store the acknowledgment in a buffer, database, or similar suitable storage location for later retrieval.

Because the receiver cannot communicate to the transmitter, it cannot provide the transmitter with any feedback regarding transmission errors. Therefore, to ensure accurate transmission of the data to the receiver 208, the transmitter can repeat at least a portion of the data signal (e.g., a data packet or group of data packets) during transmission. For example, according to one or more embodiments of the invention, the transmitter 104 transmits each packet to the receiver 208 two or three times, so that the receiver can perform a comparison of each transmission with a received checksum or digital signature. Additionally or alternatively, each of multiple received portions of a data signal (e.g., one or more data packets) can be compared to other versions of the same received portion of the data signal. The receiver 208 can, therefore, determine which of the received portions of the data signal (e.g., one or more received data packets) has been accurately received, and can discard any errant portions of the data signal. Accordingly, the receiver 208 can reconstruct the original data signal transmitted from the source device 102 of Network A, and transmit that original data signal without errors to the intended target device 202 of Network B.

In embodiments where the data signal transmitted by the transmitter 104 is encrypted, one or more suitable common encryption techniques can be used. For example, one or more public-key or private-key encryption techniques can be used, such as "pretty good privacy" (PGP) encryption, or other suitable encryption techniques. Additionally, where a hashing function of the data is performed by the transmitter 104, one or more suitable hashing techniques can be used. For example, a standard one-way hash function, such as the message digest 5 (MD5) hash function can be used. Additionally, other one-way hash functions that are more or less computationally intensive than MD5 can be used to increase the speed of data throughput, or to increase security of the hashed data. Moreover, where a checksum is generated, any suitable algorithm for creating checksums can be used.

It should be noted that because, according to one or more embodiments of the invention, an optical fiber is used as the single physical connection 106 between the transmitter 104 and the receiver 208, there are no EMI effects on the data signal transmitted carried via the conduit established on the optical fiber 106. Thus, data integrity issues associated with EMI are significantly reduced.

The transmitter 104, according to one or more embodiments of the invention, is described in greater detail below in connection with FIGS. 6 and 8. Additionally, according to one or more embodiments of the invention, the receiver 208 is described in greater detail below in connection with FIGS. 7 and 9. The method of communicating between Network A and Network B, as well as communicating data from the trusted Network 100 (shown in FIG. 4) is discussed in greater detail below in connection with FIGS. 12, 13, and 14.

The configuration illustrated in FIG. 5 can be implemented in a variety of different contexts. For example, according to one or more embodiments of the invention, Network B can be a network that has a higher security classification than Network A. Thus, information can be received across Network B's network boundary, but no information can be transmitted from Network B to a lower security network, such as Network A. Accordingly, the receiver 208 can be used in connection with receiving data into a high security network, such as Network B, by way of a single physical connection 106. In such a context, it would not matter whether the device transmitting is a unidirectional transmitter 104, or a bidirectional transceiver, which is capable of both transmitting and receiving data signals, because the receiver 208 is physically incapable of transmitting any signal by way of the single physical connection 106. Accordingly, the security of the data stored and communicated within Network B can be maintained.

Alternatively, Network A and Network B can simply have different security regulations or policies, and different corresponding security levels. For example, the two networks can represent networks of varying secrecy from two different governments that desire to share information electronically. Depending upon which government desires to receive data from another government, the unidirectional transmitter and/or receiver can be placed appropriately within the desired networks to establish a unidirectional conduit in the desired dataflow direction. For example, if the United States (U.S.) government were working jointly with the British government, and the U.S. government desired to transmit data to the British government, without allowing data to be received by the network of the U.S. government, the U.S. could establish a unidirectional communications conduit that is capable of transmitting only by using a unidirectional transmitter 104, as discussed above. That is, in such a scenario, the U.S. government would use the transmitter 104 of Network A or of the trusted network 100 (shown in FIG. 4). This configuration would prevent malicious forces or any entities with access to the network of the British government from transmitting any data or code (e.g., malicious data, viruses, etc.) to the U.S. network.

Similarly, if the British government desired to receive such information from the U.S. government, but did not want to have any sensitive data disseminated from the network of the British government, the network of the British government could implement a unidirectional receiver 208, which is physically incapable of transmitting any signal outside of the network (e.g., Network B). Thus, because there is only a single physical connection 106 between the networks, and the unidirectional receiver 208 is the only device connected to the single physical connection 106, and it is incapable of transmitting any signal via the connection, there is no possibility of an inadvertent transmission of data from the network.

Moreover, if an entity (e.g., a government, a corporation, etc.) operating a high-security network, or high network (e.g., Network B), desires to receive information from a lower-security network, or low network (e.g., Network A), that entity can use a unidirectional receiver 208, as described above. The unidirectional receiver 208 can establish a unidirectional conduit across the network boundary of the high network via a single physical connection 106 between the high network and the low network. Because there is only a single physical connection 106 between the networks, which connection 106 is connected exclusively to the receiver 208 in the high network, and because the receiver 208 is physically incapable of transmitting any signal via the conduit (or via the single physical connection 106 generally), the security of the data within the high network is maintained.

According to one or more embodiments of the invention where data flows unidirectionally from the transmitter 104 to the receiver 208, the transmitter 104 can be configured to transmit a pulse signal, which periodically signals to the receiver 208 that the transmitter 104 is still operating properly. By using such a periodic pulse signal, the receiver 208 of the receiving network, Network B, can determine if the either physical connection 106, the communications conduit established thereon, or the transmitter 104 has been compromised in any way. According to one or more embodiments of the invention, the receiver 208 can desist receiving data communicated via the conduit if an irregularity of a pulse signal from the transmitter 104 is detected, and/or exceeds a predetermined irregularity threshold amount.

Figure 6:
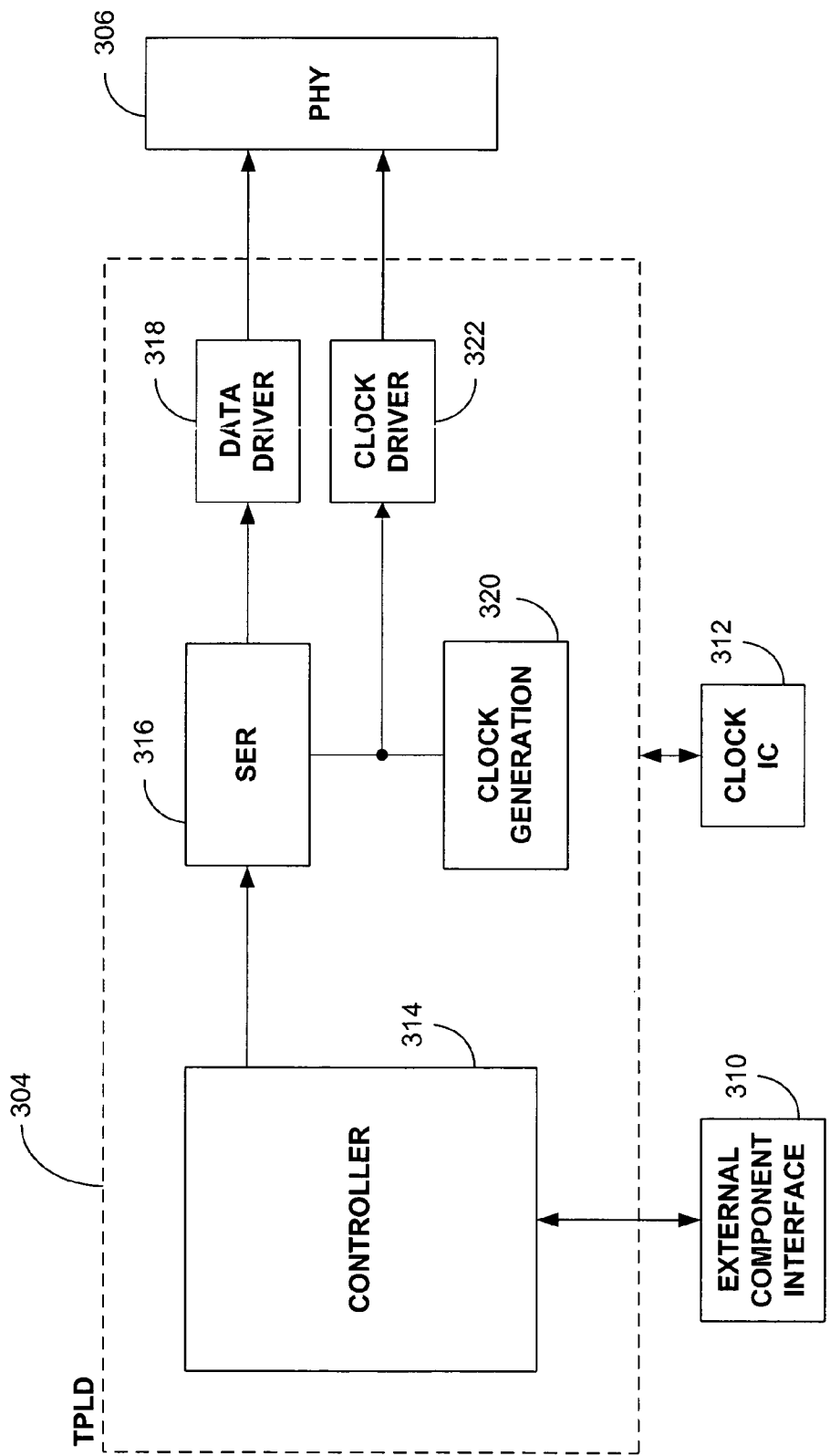
FIG. 6 is a block diagram illustrating a transmitter according to an embodiment of the invention.

FIG. 6 is a block diagram illustrating a transmitter according to an embodiment of the invention. In FIG. 6, a transmitter 304 is illustrated as a programmable logic device (PLD), or a transmit PLD (TPLD). The TPLD 304 shown in FIG. 6 can suitably function as the transmitter 104 shown in FIGS. 4 and 5, and discussed above. The TPLD 304 communicates by way of the physical layer, also referred to as "PHY" 306, which includes the single physical connection 106 between the TPLD 304, and a receiving device to which it is connected.

The TPLD 304 is also connected to an external component interface 310 that resides within the network of the TPLD 304 (e.g., within a trusted network). By way of the external component interface 310, the TPLD 304 and its various components can communicate with devices external to the TPLD 304 that are within the same network as the TPLD 304. This external component interface 310 can include, for example, a peripheral component interconnect (PCI) interface, or other similar interface. For example, where the external component interface 310 is a PCI interface, it can be the means by which the TPLD 304 connects to a PCI bus and communicates with various devices connected thereto (e.g., using a conventional PCI specification, such as PCI 2.1 PCI 2.2, PCI 2.3, or PCI 3.0, etc.). Additionally or alternatively, according to one or more embodiments of the invention, the external component interface 310 can be an integrated drive electronics (IDE) interface, configured to interface with one or more IDE devices. It should be recognized, however, that the external component interface 310 has no connection with any device outside of the network of the TPLD 304 (i.e., it is not connected to any device across a network boundary).

The TPLD 304 also communicates with a clock integrated circuit (IC) 312. The clock IC 312 is a component configured to provide the TPLD 304 and its components with a regular clock signal, which allows them to perform synchronous operations and/or reorder data blocks according to their corresponding clock value. According to one or more embodiments of the invention, the clock IC 312 can include an oscillator (e.g., a crystal) configured to provide a regular clock signal. Additionally or alternatively, the clock IC 312 can make use of a phase-locked loop (PLL) to provide a highly accurate clock signal to the TPLD 304.

The TPLD 304 includes a controller 314. According to one or more embodiments of the invention, the controller 314 can be an IP-PCI/MT32 PCI core available from Altera Corp. of San Jose, Calif., or other suitable controller, capable of performing the requisite transmission functions, and interfacing with the external component interface 310. The controller 314 can, according to one or more embodiments of the invention, support one or more network interface applications, such as a web server (e.g., the Apache web server, etc.).

The controller 314 communicates with the external component interface 310, which can communicate with devices located within the network in which the TPLD 304 is located. Thus, by way of the external component interface 310, the controller 314 can receive data signals intended to be transmitted across the physical layer 306 (e.g., by way of a logical conduit established over a single physical connection) to a single device located outside of the network of the TPLD 304. According to one or more embodiments, the various data packets or data blocks received by the controller 314 via the external component interface 310 are communicated to a serializer (SER) 316.

Data communicated from the controller 314 to the SER 316 can, according to one or more embodiments of the invention, include multi-bit data, or data in a multi-bit format. Specifically, according to one or more embodiments of the invention, the controller 314 can communicate 32-bit data to the SER 316. The SER 316 serializes this data, and provides it to the data driver 318. To properly serialize the data, the SER 316 receives a clock signal generated by a clock generation component 320, which generates an internal clock signal within the TPLD 304, based upon the clock signal received from the clock IC 312. The clock signal from the clock generation component 320 is also provided to a clock driver 322, which is configured to transmit a clock signal (designated CLK) to the physical layer.

The serialized data and the clock signal (CLK) are simultaneously transmitted to the physical layer 306 by the data driver 318 and the clock driver 322, respectively. According to one or more embodiments of the invention, the data driver 318 and the clock driver 322 are optical drivers configured to transmit their respective signals to the physical layer 306 optically. According to this configuration, the physical layer 306 includes an optical fiber, suitable for transmitting the optical signals (i.e., the data signal and the clock signal) received from the data driver 318 and the clock driver 322, respectively.

The controller 314 can provide additional manipulation of data received from the external component interface 310. For example, as described above, the controller 314 can repackage the data according to a protocol different from the original protocol with which the data was packaged. Additionally, the controller 314 can cause transmission of periodic pulse signals, which allow a receiver to monitor the performance of the transmitter 304, and determine that it is still functioning correctly, and that the conduit between the transmitter 304 and the receiving device has not been compromised.

Additionally, the controller 314 can perform additional operations on the data transmitted by the TPLD 304. For example, the controller can encrypt the data, perform a hashing function on the data, generate a digital signature, and/or generate a checksum of the data. The controller 314 can also be configured to cause a digital certificate and/or a digital signature to be transmitted along with a data signal. In cases where a bidirectional protocol is used by the network of the TPLD 304, the controller 314 can provide source devices within the network (i.e., devices from which the TPLD 304 receives data to be transmitted across a network boundary) with acknowledgment signals, where required. According to one or more embodiments of the invention, the controller 314 can send two, three, or more repeats for each portion of the data signal (e.g., one or more data packets) transmitted by the controller 314, such that a receiving device can verify the correct data of the portion of the data signal (e.g., by determining what data is contained in the majority of the received portions of the data signal).

The controller can operate using one or more suitable operating systems. Preferably, the controller 314 uses a stable and secure operating system (OS). According to one or more embodiments of the invention, the controller 314 makes use of an open Berkeley software distribution (BSD) OS, such as the OpenBSD OS. The OpenBSD OS is an open OS that is generally considered secure, and is encryption-ready. The OpenBSD OS also includes error detection and/or correction capabilities (e.g., for single data packets or full data files). Additionally, the OpenBSD OS is capable of supporting custom protocols for transmitting or receiving data, which can be advantageously used according to one or more embodiments of the invention. Other operating systems suitable for performing the required data operations can also be used by the controller 314, depending upon system constraints or other requirements.

Figure 7:
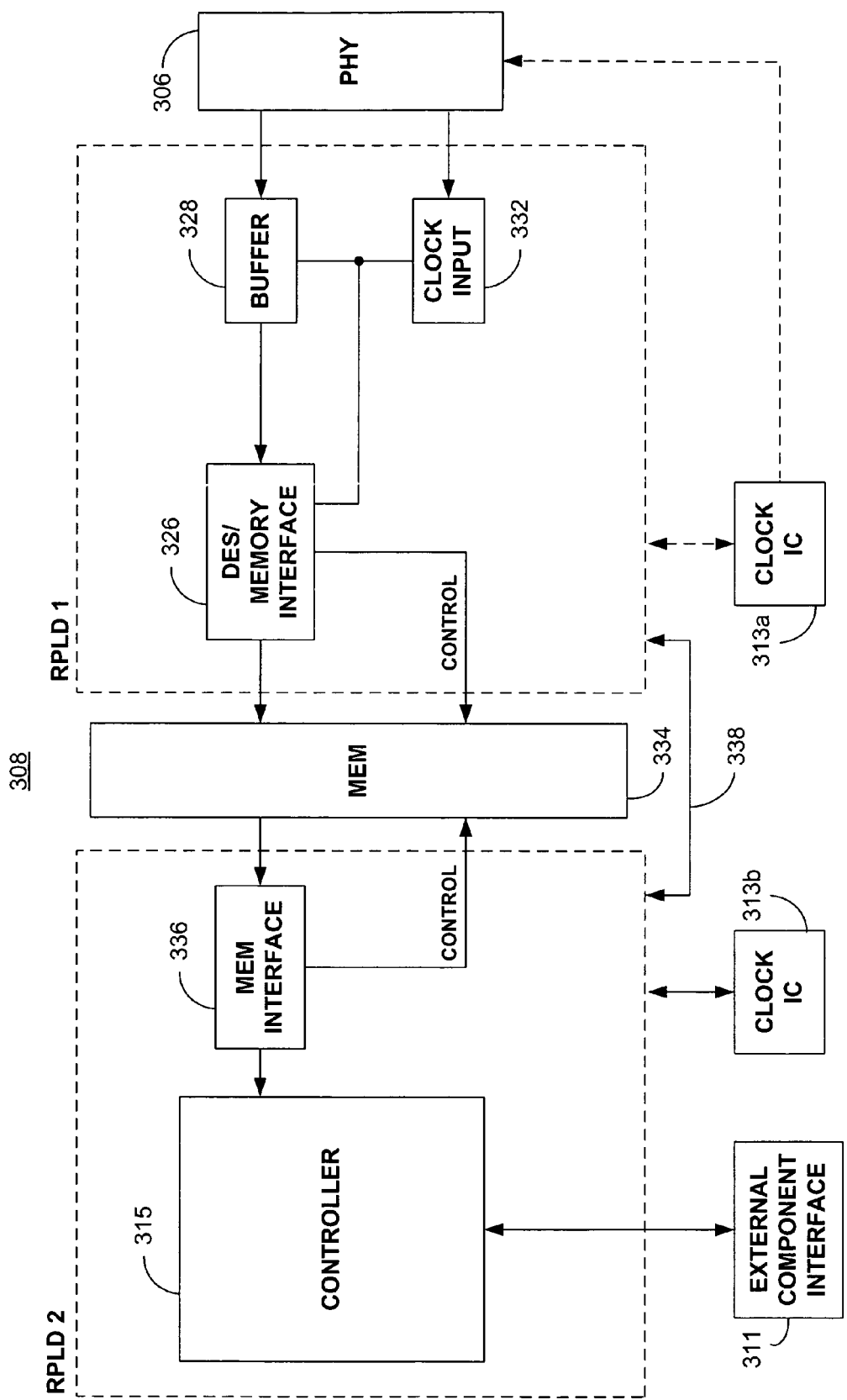
FIG. 7 is a block diagram illustrating a receiver according to an embodiment of the invention.

FIG. 7 is a block diagram illustrating a receiver according the embodiment of the invention. The receiver 3 in FIG. 7 uses two receiver PLDs (RPLDs), RPLD 1 and RPLD 2. According to one or more embodiments of the invention, the receiver 308 in FIG. 7 can be used as the receiver 108 (shown in FIG. 4) and/or the receiver 208 (shown in FIG. 5).

The first RPLD (RPLD 1) receives both the data signal and the clock signal from the physical layer 306, which may be transmitted, for example, by the TPLD 304 (shown in FIG. 6). The data signal is received by the buffer 328, and the clock signal is received by a clock input component 332. The data received from the physical layer 306 by the buffer 328 is serialized data. The clock signal and the serialized data from the buffer 328 are communicated to the deserializer (DES)/memory interface component 326. The DES/memory interface component 326 subsequently deserializes the data, and translates it into multi-bit data (i.e., data in a multi-bit format, such as 32-bit data), using the clock signal from the clock input 332 as a reference. It should be noted that the RPLD 1 can also (like the TPLD) be connected to a clock IC 313a by which it receives a clock signal. This connection of the RPLD 1 to the clock IC 313a can optionally be either direct, or by way of the physical layer 306, as shown in FIG. 7. For example, the clock signal for the RPLD 1 can be received from the TPLD 304 via the physical layer. The clock IC 313a can be similar to the clock IC 312 described above in connection with FIG. 6, and can be any clock IC suitable for providing the RPLD 1 with a regular clock signal (e.g., an oscillator and/or a PLL, etc.).

The multi-bit data is transmitted by the DES/memory interface component 326 to a memory component 334 (also designated MEM) external to the RPLD 1, along with a control signal. The RPLD 1 can communicate data to the memory component 334 asynchronously with respect to the RPLD 2. According to one or more embodiments of the invention, the multi-bit data transmitted by the DES/memory interface component 326 can be 32-bit data. The memory component 334 can include any suitable memory component for storing the multi-bit data received from the DES/memory interface component 326. For example, according to one or more embodiments of the invention, the memory component 334 can include random access memory (RAM), such as a dual-port RAM component, or other suitable storage device. For example, the memory component can include a true dual-port SRAM, such as the IDT-70V3599 (or similar device), available from IDT Corp. of Santa Clara, Calif. Alternatively, the memory component 334 can be a switchable device, such as the IDT-70V7519 (or other similar device), which is pin-compatible with the IDT-70V3599, and is also available from IDT corporation. According to one or more embodiments of the invention, the memory component 334 can include a scalable memory device, the size of which is adjustable according to design requirements or expected file sizes.

The data stored by the memory device 334, which is received from the RPLD 1, is subsequently transferred to the second RPLD (RPLD 2). More specifically, the multi-bit data is transferred to, or retrieved by, a memory interface component 336. Like the DES/memory interface component 326, the memory interface component 336 of the second RPLD, also communicates a control signal to the memory component 334, instructing which data is to be transferred to, or retrieved by, the memory interface component 336 from the memory component 334. The multi-bit data is transmitted by the memory interface component 336 to the controller 315 of the RPLD 2. This controller 315 can be similar to the controller 314 of the TPLD 304 (shown in FIG. 6), described above. Specifically, according to one or more embodiments of the invention, the controller 315 of the RPLD 2 can be a PCI core controller, such as the IP-PCI/MT32 PCI core available from Altera Corp. Of course, the type of controller 315 used by the RPLD 2 depends at least partially on the protocols used by the devices with which the receiver 308 communicates, and upon design constraints. For example, if the controller 315 is connected via an external component interface 311 that is a PCI interface (similar to the external component interface 310 of FIG. 6), then the controller 315 will usually be a PCI controller, capable of controlling a PCI interface. If, on the other hand, the controller is connected to devices via a different type of external component interface (e.g., IDE, USB, etc.), then the controller would be a controller suitable for such an interface.

Like the TPLD 304 and the first RPLD (RPLD 1), the second RPLD (RPLD 2) can also be in communication with a clock IC 313b, which can be similar to, or the same as, the clock IC 313a connected to the RPLD 1 and/or the clock IC 312 connected to the TPLD 304 (shown in FIG. 6). Additionally, it should be noted that the RPLD 1 and the RPLD 2 can be directly connected, to share information other than just the data shared through the memory component 334. This can be accomplished, for example, by way of a "side chain" connection 338, that directly connects the two RPLDs (RPLD 1 and RPLD 2). By way of the side chain connection 338, the RPLD 1 can communicate important information to the RPLD 2, such as configuration information, error information, or other desired information.

The controller 315 of the RPLD 2 can perform additional operations on the multi-bit data received from the memory interface component 336. Specifically, the controller 315 can perform operations on the received data that are the inverse operations of those performed by the controller of the transmitter that sent the data (e.g., the controller 314 of the TPLD 304 shown in FIG. 6). Thus, the controller 315 can decrypt information, can unpackage data that has been repackaged from its original protocol, and/or receive periodic pulse signals from a transmitter (e.g., the controller 314 of the TPLD 304 shown in FIG. 6), or other functions. Additionally, the controller 315 can receive acknowledgment signals from devices receiving the data via the external component interface 311, and can optionally cause those received acknowledgement signals to be stored for later retrieval. Additionally or alternatively, the controller 315 can perform comparison functions, comparing multiple transmissions of portions of the data signal (e.g., one or more data packets) to determine the true nature of the intended transmission. The controller can also compare received data signals to a digital signature or checksum created sent by a transmitter (e.g., the digital signatures and/or checksums created by the controller 314 of the TPLD 304 shown in FIG. 6). Also, the controller 315 can analyze and compare a digital certificate or other data, if desired.

It should be noted that the construction of the receiver 308 in FIG. 7, using two RPLDs, is entirely optional. Thus, according to one or more embodiments of the invention, the receiver might include a single RPLD, which uses a DES 326 for communicating data directly to the controller 315. Such an alternate construction, may, however, be suitable for only certain applications. Specifically, by buffering the data to a buffer 328, and then using a memory component 334, as occurs with the configuration shown in FIG. 7, data is less likely to be lost or delayed during high-speed transmissions. Thus, where such high-speed transmissions are desirable, a buffering configuration, such as the one shown in FIG. 7, may also be desirable.

The configurations of the transmitter 304 and the receiver 308 in FIGS. 6 and 7 can advantageously be used in components configured to connect to existing, standard components or systems. For example, the transmitter 304 or the receiver 308 can be integrated within a network interface card (NIC), or in some cases within a single application specific integrated circuit (ASIC). For example, in cases where the physical layer corresponds to an optical fiber, an ASIC or integrated system, such as a "system on a chip" (SOC), can include a component interface to standard components, as well as a semiconductor laser or light emitting diode (LED) driver or photodiode receiver. Thus, because the entire transmitter 304 or receiver 308 can be fully incorporated within a single device, that device can be accredited (e.g., to a specific EAL, according to C4ISR requirements, etc.) without regard to the system or device by which it is to be used.

Figure 8:
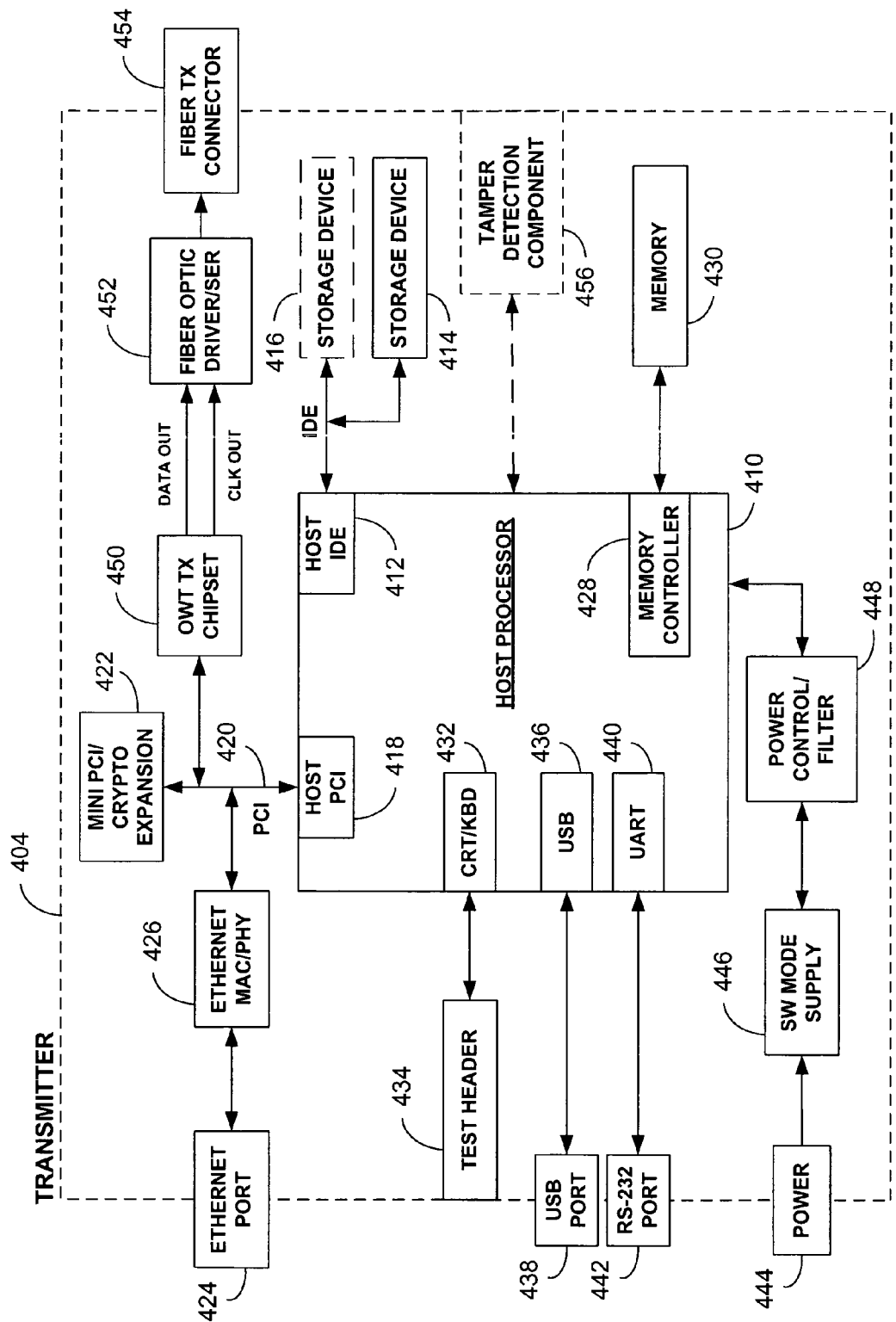
FIG. 8 is a block diagram illustrating a transmitter according to an embodiment of the invention.

FIG. 8 is a block diagram illustrating a transmitter according to another embodiment of the invention. In FIG. 8, the transmitter 404 is controlled by a host processor 410. According to one or more embodiments of the invention, the host processor 410 can be similar to the controller 314 of the TPLD 304 (shown in FIG. 6) or the controller 315 of the RPLD 2 (shown in FIG. 7). The transmitter 404 can be housed in a rack-mountable, tamper-proof enclosure, which can be configured to take up less than one unit (1U) of rack space in a conventional data rack system.

The host processor 410 includes a number of controlling components, configured to control various devices within the transmitter 404. According to one or more embodiments of the invention, the host processor 410 can be a SOC. Among the controlling components included in the host processor 410 are two host components configured to connect to devices within (or optionally external to) the transmitter 404. For example, a host IDE interface component 412 can be provided for communicating with IDE devices, such as one or more storage devices 414, 416. For example, these storage devices 414, 416, can comprise standard storage devices using magnetic memory media, or flash memory devices, depending upon the desired performance of the storage devices 414, 416.

The host processor 410 also includes a host PCI interface component 418, which is capable of communicating via a PCI bus 420 with various devices connected to the PCI bus 420. For example, the host PCI interface component 418 can communicate with a mini-PCI/cryptographic (crypto) expansion component 422 within the transmitter 404. This mini PCI/crypto expansion component 422 can allow the host processor 410 to encrypt data prior to transmission. According to one or more embodiments of the invention, the various devices that communicate via the PCI bus 420 can use one of the conventional PCI specifications (e.g., PCI 2.1, PCI 2.2, PCI 2.3, PCI 3.0, etc.), and can be capable of 32-bit communications at speeds of 33 MHz, 66 MHz, or greater.

The host PCI interface component 418 can also allow the host processor 410 to communicate with an Ethernet port 424. The Ethernet port 424 can be connected to various devices within the network of the transmitter 404. Thus, it can be by way of the Ethernet port 424 that the transmitter 404 receives data from a source device to be transmitted beyond the network boundary of the network of the transmitter 404. According to one or more embodiments of the invention, the Ethernet port 424 can be an Intel 82559 10/100 Mbps Ethernet controller available from Intel Corporation of Santa Clara, Calif. Data received via the Ethernet port 424 can be communicated to the PCI bus by way of an Ethernet message authentication code (MAC)/physical layer (PHY) component 426. This component 426 can allow the host processor 410 to compare digital signatures, checksums, digital certificates, or the like, related to the data received via the Ethernet port 424.

Also included in the host processor 410 is a memory controller 428, which can be configured to control and communicate with a memory component 430 within the transmitter 404. This memory component 430 can be the main memory used by the host processor 410. According to one or more embodiments of the invention, the memory component 430 can be a static RAM (SRAM) device, such as an SRAM single in-line memory module (SIMM), or other suitable configuration. According to one or more embodiments of the invention, the memory component 430 can be a scalable memory device, the size of which is adjustable according to the requirements of the system in which it is used or according to the expected file sizes.

The host processor 410 also includes a monitor/keyboard interface component 432 (also designated CRT/KBD) which can include the capability of interfacing with a variety of monitors, such as a cathode ray tube (CRT) monitor, a liquid crystal display (LCD) monitor, or other type of monitor. Using the monitor/keyboard interface component monitor/keyboard interface component 432, the host processor 410 is able to interface with a monitor and/or keyboard, for the purposes of operating a test header 434, which allows a user (within the network of the transmitter 404) to access and configure the BIOS of the host processor 410.

The host processor 410 also includes a universal serial bus (USB) interface component 436, which is capable of communicating with USB devices via a USB port 438. By way of the USB port, the transmitter 404 (e.g., via the host processor 410) can communicate with a number of USB-configured devices. For example, by way of the USB port 438, the host processor 410 can receive data stored on one or more USB-configured storage devices, which can then subsequently be prepared for transmission across a network boundary.

Additionally, the host processor 410 can include a universal asynchronous receiver transmitter (UART) interface component 440 configured to communicate with a UART-compatible port, such as a recommended standard 232 (RS-232) port 442. The RS-232 port 442 can communicate with one or more devices within the network of the transmitter 404, and receive data to be transmitted by the transmitter 404 across the network boundary of the network of the transmitter 404. For example, according to one or more embodiments of the invention, the UART interface component 440 can operate as a modem, and can connect to a PSTN or other similar telephone network. Additionally or alternatively, the RS-232 port can include a driver, either integrally formed with the port or separate from the port, such as a MAX232 RS-232 port, available from Maxim Integrated Products, Inc. of Sunnyvale, Calif.

The host processor 410, and transmitter 404 generally, receives power from a power connection port 444. The power from the power connection port 444 is provided to a switched (SW) mode supply 446. The SW mode supply 446 provides power to the host processor 410 via a power control/filter component 448. The control/filter component 448 serves to control the power applied to the host processor 410, as received by the SW mode supply 446, and to filter noise on the power signal, as necessary.

It should be noted that each of the inputs to the transmitter 404 are illustrated on the left-hand side of the transmitter 404 in FIG. 8. It is by way of these input ports that the transmitter 404 receives any type of signal whatsoever. Thus, any connections to devices within the network of the transmitter 404, from which the transmitter 404 is to receive data, must be accomplished by one of these ports illustrated on the left-hand side of the transmitter 404. It should be recognized that the various input ports of the transmitter 404 can be located in different physical locations, depending upon the desired function of the transmitter 404. For example, in some applications, it may be desirable to physically separate the input ports from any output port (e.g., the fiber TX connector 454, discussed below), as shown in FIG. 8. Alternatively, however, such a physical separation may not be required or even desired.

Data received by one of the input ports is transmitted to the host processor 410 and prepared for transmission across the network boundary of the network of the transmitter 404. This may include, for example, repackaging the data using a different protocol, encrypting the data, performing a hashing function on the data, creating a checksum of the data, creating a digital signature of the data, preparing multiple repeats of data packets, or at least a portion of the data signal, and/or other functions as desired. Additionally or alternatively, the host processor 410 can communicate an acknowledgement signal (ACK) to a device within the network of the transmitter 404, if the device expects such an acknowledgement. The host processor 410 can also, for example, perform such functions as cyclical redundancy checking (CRC) or other error detection techniques.

Once data has been operated on by the host processor 410 as desired, prior to transmission, it is transmitted by the host PCI component 418 and via the PCI bus 420 to the one-way transfer (OWT) transmission (TX) chip set 450. This transmission chip set 450 prepares a data signal and a clock signal, which it transmits to a fiber optic driver/SER 452. As with the TPLD 304 (shown in FIG. 6), the transmitter 404 can be connected to a clock IC, or other clock generation device (not shown), which the OWT chip set 450 uses to generate the clock signal passed to the fiber optic driver/SER component 452.

The fiber optic driver/SER component 452 can be a single component, or multiple components, such as a driver and a separate serializer. The driver can be, for example, a laser diode, an LED, or other suitable optical transmission device. The optical signal is transmitted by way of a fiber TX connector 454, which is connected using a single physical connection to a receiver across a network boundary of the network of the transmitter 404.

Thus, as the fiber optic driver/SER 452 is capable only of emitting photons, and not receiving them, and as there is only a single physical connection via the fiber TX connector 454 to a receiver across the network boundary, the transmitter 404 is physically incapable of receiving any signal from outside of the network of the transmitter. Additionally, as optical signals are used, EMI cannot interfere with the signal, and cannot cause the driver to unwittingly receive signal transmissions from outside of the network of the transmitter 404.

Additionally, for added security, a tamper detection component 456 can be added to the housing of the transmitter 404 to detect any tampering with the housing, depending upon the application desired for the transmitter 404. Thus, the integrity of the housing of the transmitter 404 can be maintained and assured, as the tamper detection component 456 relays any attempt to tamper with the housing of the transmitter 404 to the host processor 410. SNMP traps can be used to verify the status of the host processor 410, and can, for example, alert appropriate individuals (e.g., a network administrator, etc.) if the transmitter 404 and/or the host processor 410 are not operating properly. This could include, for example, an indication by the host processor 410 that the tamper detection component 456 has detected tampering with the housing of the transmitter 404, which in some instances might represent a security risk. Additionally, or alternatively, the host processor 410 can be programmed to communicate to one or more devices to which it is connected (either within its same network, or outside of its network) when a condition has occurred that may require attention within the transmitter 404.

Moreover, as an added precaution to provide additional data security, the housing of the transmitter 404 can be devoid of any indications of activity, such as any lights indicating activity within the housing. For example, according to one or more embodiments of the invention, the transmitter 404 can be housed within a housing that does not have any lights indicating that data is being transferred. Additionally, the housing of the transmitter 404 can omit any lights or other indicators showing that power to the device has been activated.

Figure 9:
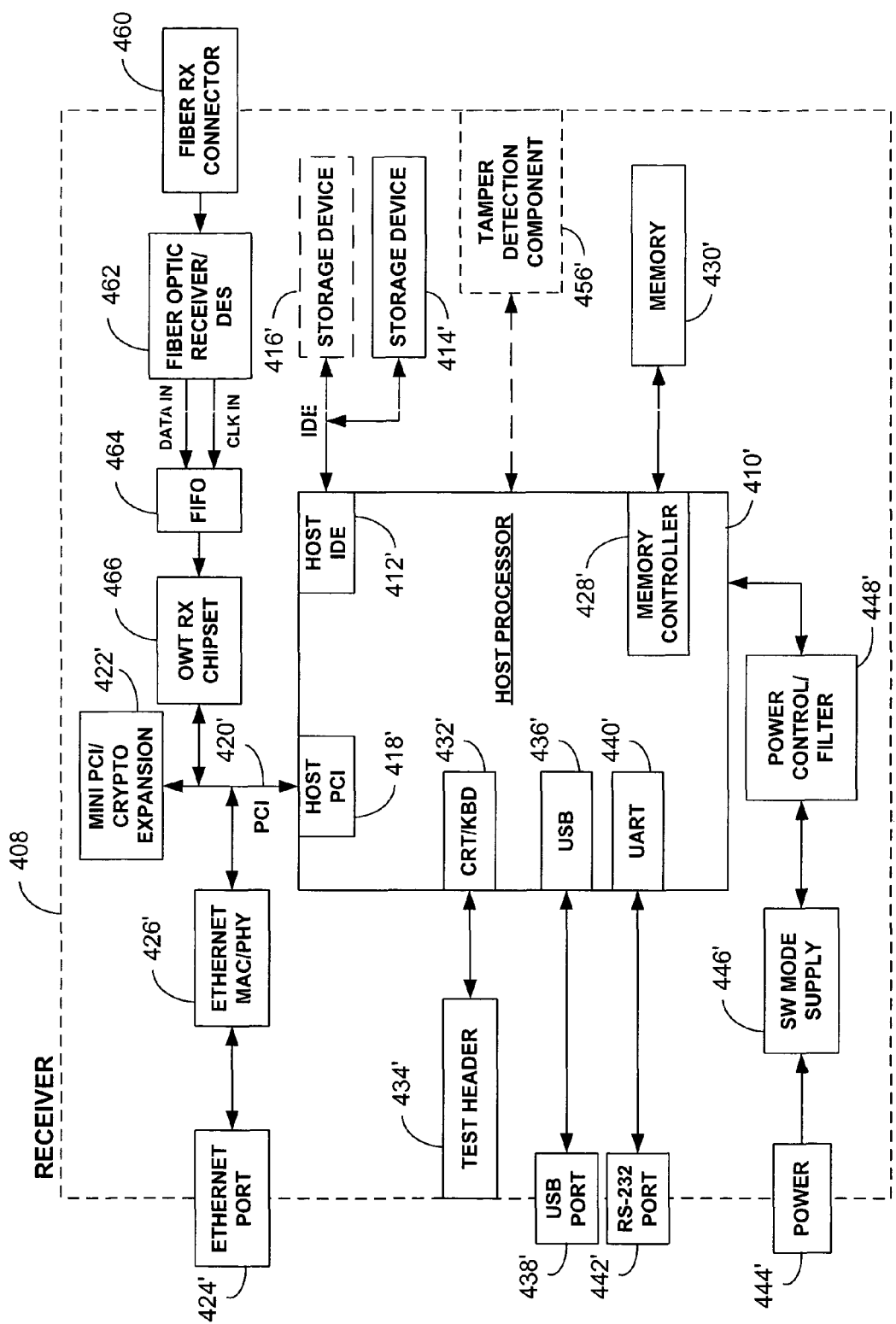
FIG. 9 is a block diagram illustrating a receiver according to an embodiment of the invention.

FIG. 9 is a block diagram illustrating a receiver according to another embodiment of the invention. The receiver 4 in FIG. 9 has many components that are similar to the transmitter 404 (shown in FIG. 8), and can be housed in a housing similar to the housing of the transmitter 404. Those components that could be the same or similar are shown with reference numbers that are the similar to the reference numbers shown in FIG. 8, but include a prime designation. Thus, the host processor (which was element 410 in FIG. 8) is element 410', and so forth. In general, the possibility that the components can be the same or similar to those of the transmitter 404 (shown in FIG. 8) is assumed to be at least one possibility, and will not be discussed in detail.

Of course, the function of the components of the receiver 408 will be different from the function of the components of the transmitter 404 (shown in FIG. 8) because they are performing receiving functions rather than transmitting functions. Accordingly, the ports connecting the receiver 408 to devices within the network of the receiver 408 (shown on the left-hand side in FIG. 9) are relaying information received from beyond a network boundary by the receiver 408 to the devices within the network of the receiver 408. Likewise, the host processor 410' is configured to unpackage, decrypt, compare multiple repeated portions of a data signal, compare portions of a data signal with a digital signature and/or a checksum, review a digital certificate, and so forth, as discussed above in connection with the controller 315 of the RPLD 2 (shown in FIG. 7). The host processor can also receive (e.g., via the Ethernet port 424') an acknowledgement signal from a device within its network, which it can optionally store (e.g., in the memory component 430' and/or the storage devices 414', 416') for later retrieval, if desired.

It should be noted that, as with the transmitter 404, each of the inputs to the receiver 408 illustrated on the left-hand side of the receiver 408 in FIG. 9 can be located in different physical locations, depending upon the desired function of the receiver 408. For example, in some applications, it may be desirable to physically separate the output ports from any input port (e.g., the fiber RX connector 460, discussed below), as shown in FIG. 9. Alternatively, however, such a physical separation may not be required or even desired.

Data is received from beyond the network boundary of the receiver 408 by a single physical connection (e.g., an optical fiber) via the fiber RX connector 460. data is received in serialized form, and the fiber optic receiver/DES component 462 is used to receive and deserialize the optical data introduced at the fiber RX connector 460. The fiber optic receiver/DES component 462 can be a single, multi-function component, or can be multiple, separate components in communication with one another. For example, if the optic receiver/DES component 462 is a single component, it can both sense/receive the incoming data signal and deserialize the data. On the other hand, if the optic receiver/DES component 462 includes multiple, separate, interconnected components, it can include, for example, an optical receiver (e.g., a photodiode, or other optical detector) and a deserializer, which deserializes the data signal once it has been converted from an optical signal to an electronic signal. Of course, as mentioned above, the optic receiver/DES component 462 is physically incapable of transmitting via the single physical conduit (e.g., optical fiber), and thus, there is no chance that the receiver 408 will inadvertently transmit data across a network boundary.

Once the received data has been deserialized, it can also be broken into its components (e.g., Data and CLK signals). The data is passed to a first-in-first-out (FIFO) storage component 464, which can be a simple memory buffer. For example, the FIFO 464 can be a non-volatile (e.g., a programmable read only memory, or PROM, flash memory, etc.) or a volatile memory device (e.g., a CMOS device, such as SRAM, SDRAM, etc.). According to an embodiment of the invention, the FIFO can be an IDT-72V36110, available from IDT Corp. Data from the FIFO storage component 464 is communicated to the one-way transfer (OWT) receiver (RX) chipset 466, which can communicate the received data signal to the host processor 410' via the PCI bus 420' for further handling.

Additionally, as with the transmitter 404 (shown in FIG. 8), a tamper detection component 456' can be added to the housing of the receiver 408 to detect any tampering with the housing. SNMP traps can be used to verify the status of the host processor 410', and can, for example, alert appropriate individuals (e.g., a network administrator, etc.) if the receiver 408 and/or the host processor 410' are not operating properly. This could include, for example, an indication by the host processor 410 that the tamper detection component 456 has detected tampering with the housing of the receiver 408, which in some instances might represent a security risk. Additionally, or alternatively, the host processor 410' can be programmed to communicate to one or more devices to which it is connected within its network when a condition has occurred that may require attention within the receiver 408.

Figure 10:
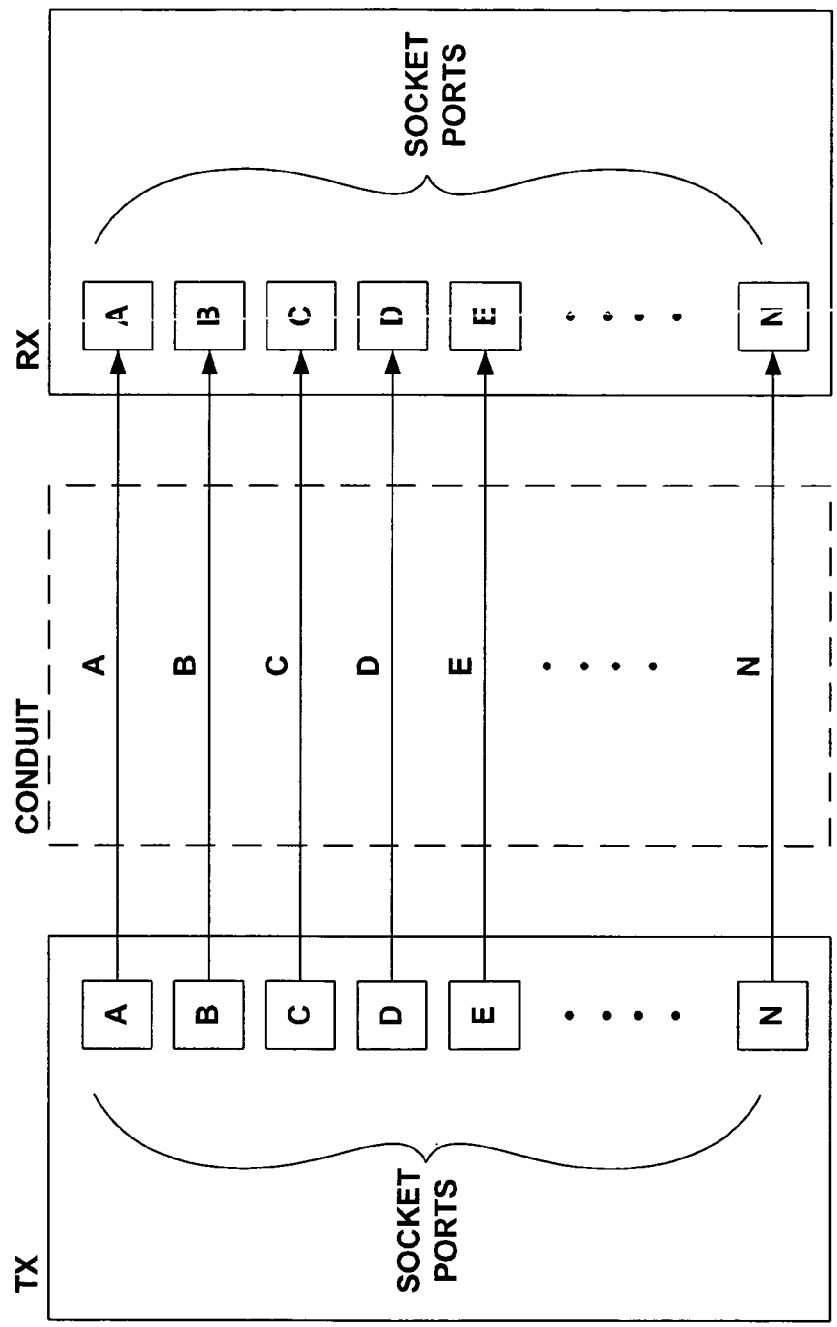
FIG. 10 is a block diagram illustrating a one-way conduit according to an embodiment of the invention.

FIG. 10 is a block diagram illustrating a one-way conduit according to an embodiment of the invention. In FIG. 10, a conduit is shown as providing a unidirectional flow of data (e.g., in the form of a data signal, etc.) from a transmitter (also designated TX) to a receiver (also designated RX). The conduit, as described above in connection with FIG. 4 and FIG. 5 is carried over a single physical connection between the transmitter and the receiver, which is the only connection carrying data across one or more network security boundaries. Moreover, the conduit is unidirectional, in that the transmitter transmits to the receiver, and the transmitter is incapable of receiving any signals via the conduit and/or the receiver is incapable of transmitting any signals via the conduit. Thus, even if one device communicating via the conduit were capable of bidirectional communication, the conduit would remain unidirectional, because at least one of the two devices communicating via the conduit is incapable of anything other than one-way communication. Therefore, reversing the data flow from the direction shown in FIG. 10 (i.e., from TX to RX) is impossible regardless of which of the devices is a unidirectional device.

For example, according to one or more embodiments of the invention, the transmitter can be an optical transmitter (e.g., a laser diode, LED, etc.), which is capable of emitting photons, but which has no capability for sensing them. The conduit can be established using a single optical fiber, which prevents any EMI from affecting the data signal, the transmitter, or the receiver. The receiver can be an optical receiver that is capable of detecting photons. For example, the receiver can include a photo diode that is capable of sensing photons, but has no capability or emitting photons of any kind.

According to one or more embodiments of the invention, the transmitter can communicate using multiple socket ports over a single conduit with the receiver. Each port A, B, C, D, E, . . . , N of the transmitter has a corresponding socket port on the receiver. By using multiple ports over a single conduit, a large amount of data can be transmitted over the conduit. Additionally, because the data from one socket cannot mix with the data from another socket, multiple, separate signals, each corresponding to a different socket port can be transmitted from the transmitter to the receiver over the conduit. Thus, as shown in FIG. 10, the data from the first socket port of the transmitter (labeled port A) is communicated directly to the first socket port of the receiver (labeled port A), without mixing data with data from other socket ports. The same is true for each of the remaining socket ports, each of which is capable of transmitting data directly to a counterpart socket port on the receiver, without mixing data during transmission in the conduit. This implementation of multiple sockets communicating separately over a single conduit can be thought of a providing multiple virtual conduits, which provide multiple configurable data paths over the same conduit, because the data from each socket cannot mix with the data from another socket.

The number of socket ports available on the transmitter and the receiver can vary, and may be determined by the type of protocol with which they are used. According to one or more embodiments of the invention, the socket ports of both the transmitter and receiver can be defined by the protocol used to transmit the data over the conduit or used within the respective networks of the transmitter and receiver. For example, the socket ports of the transmitter and receiver can correspond to TCP socket ports, and the conduit can carry data packaged using TCP. Similarly, other suitable protocols can be used.

According to one or more other embodiments of the invention, the socket ports of the transmitter and/or receiver can correspond to a different protocol than the protocol by which data is communicated over the conduit. For example, the transmitter and receiver can communicate with devices within their respective networks using a first protocol (e.g., TCP, IP, etc.), while data carried over the conduit can be communicated using a second protocol (e.g., UDP, etc.). Thus, in an embodiment where the networks of both the transmitter and receiver use TCP to communicate, the socket ports of each device correspond to TCP socket ports (e.g., TCP socket port A, TCP socket port B, etc.). The data communicated via the conduit, however, in an embodiment using UDP communications over the conduit, are communicated using a matching port in that protocol (e.g., using UDP socket A, UDP socket B, etc.).

In this manner, numerous separate data signals can be carried between the transmitter and the receiver over the one-way conduit. Of course, generic letters have been substituted for the socket numbers in FIG. 10; however, these sockets can include, for example, TCP sockets: 3333, 5001, 34520, 6000, 31201, and other available sockets, as well as the corresponding UDP sockets: 3333, 5001, 34520, 6000, 31201, and other available sockets.

Figure 11:
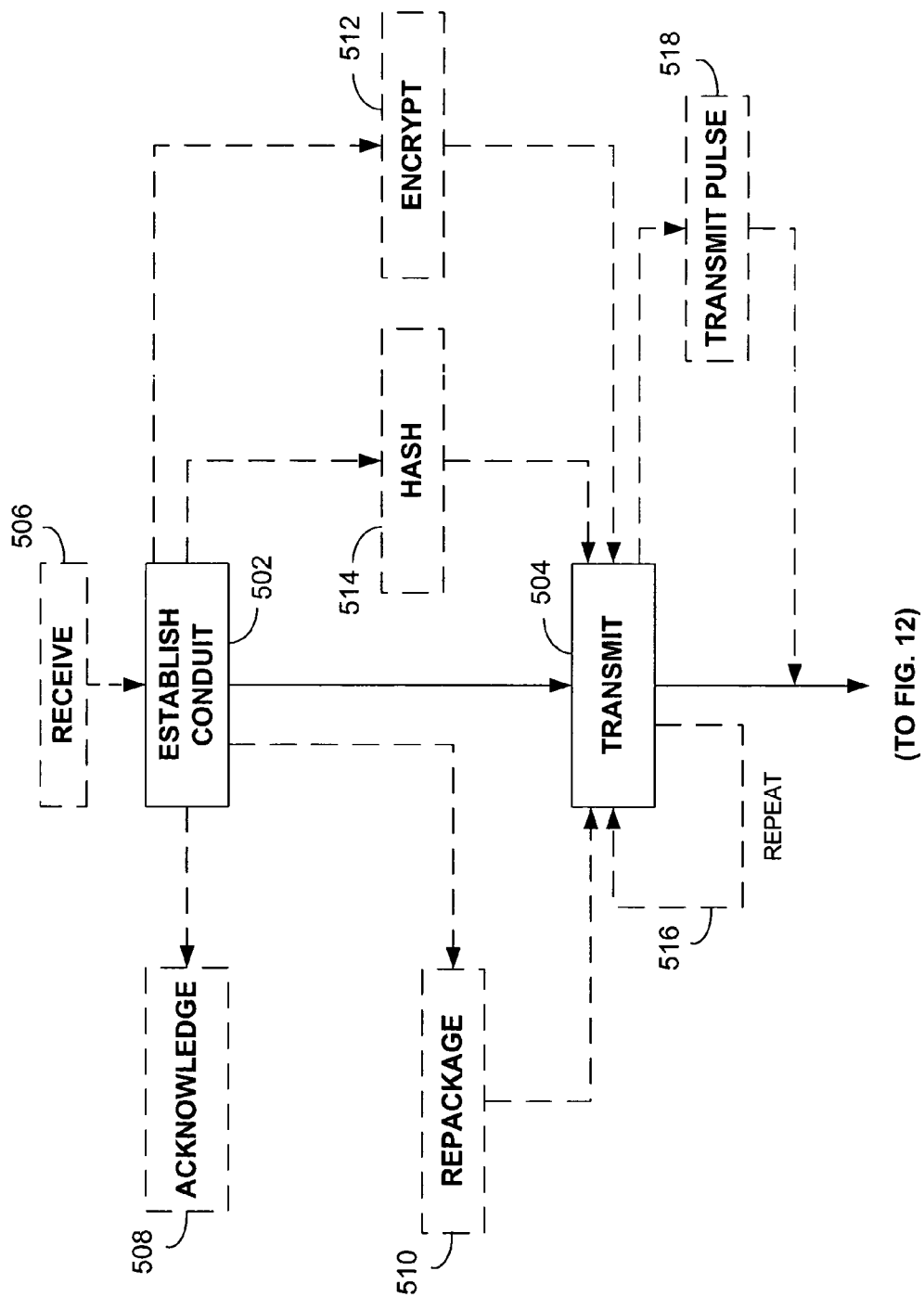
FIG. 11 is a flow diagram illustrating steps implemented by a transmitter according to an embodiment of the invention.

FIG. 11 is a flow diagram illustrating steps implemented by a transmitter according to an embodiment of the invention. As discussed above, the transmitter establishes a unidirectional conduit in step 502 and transmits data to a receiver across at least one network boundary in step 504. The conduit established in step 502 is a unidirectional conduit by which the transmitter can transmit, but is physically incapable of receiving data. The conduit is the only communications channel between the network within which the transmitter operates and any device outside that network, and is established over a single physical connection from the network of the transmitter to a receiver device outside of that network.

According to one or more embodiments of the invention, the transmitter receives data from one or more devices within its network in optional step 506. In this manner, the transmitter can act as the single gateway for transmitted communications across a network boundary from multiple devices located in the network of the transmitter. As discussed above, the devices within the network of the transmitter can actively use the transmitter as a gateway or, alternatively, the gateway functions of the transmitter can be transparent to those devices.

When a bidirectional communications protocol is used within the network of the transmitter, devices sending data via the transmitter and the conduit established thereby, will expect an acknowledgement signal (ACK) from the target device outside of the network of the transmitter. Because the conduit across the network boundary is unidirectional, however, actually receiving an acknowledge signal from such a target device would be impossible, even if the device were to transmit one. Thus, the transmitter can optionally provide such an acknowledgement in optional step 508, telling the device that the data transmitted (e.g., a data packet or group of data packets received by the transmitter) was safely received. In the case where the device receiving the acknowledgement from the transmitter actively uses the transmitter as a network gateway (i.e., is aware of it's presence), the acknowledgement will serve to indicate to the device that the transmitter has received the previously transmitted data. In the case where the transmitter is transparent to the device receiving the acknowledgement from the transmitter (i.e., the device is unaware of the transmitter's existence), the acknowledgement will appear to be from the intended target device (i.e., the device across the network boundary). In either case, the same result is achieved, as the device knows that the data it is transmitting has been safely received and it can transmit the next data packet or packets.

As described above, the transmitter can optionally repackage the data to be transmitted via the conduit, as shown in optional step 510. According to one or more embodiments of the invention, the data to be transmitted can be repackaged using a different protocol than the protocol used within the network of the transmitter. For example, the network of the transmitter can use a bidirectional communications protocol (e.g., TCP, etc.), while the transmitter can transmit data across the conduit using a unidirectional protocol (e.g., UDP, etc.). Additionally, as discussed above, although a separate optional step (step 512, discussed below) is shown as allowing encryption of the data, the repackaging accomplished in optional step 510 can include encryption, or any other suitable repackaging technique desired for preparing the data to be transmitted via the conduit. For example, repackaging can include adding certain elements to the data signal, such as a digital certificate, a checksum, a digital signature, and so forth.

As discussed above, the data transmitted by the transmitter can be operated upon using an encryption algorithm and/or a hashing algorithm, or any other desired operation, including, for example, repeating at least a portion of the data signal (e.g., one or more data packets) during transmission. The data to be transmitted can be encrypted in optional step 512 to protect the secrecy of the data being transmitted. This encryption can be accomplished using a variety of suitable encryption techniques of varying complexity, including, but not limited to, public-key encryption techniques and private-key encryption techniques, such as PGP encryption, or other suitable encryption algorithms.

Additionally or alternatively, a hash function can be executed on the data prior to transmission in optional step 514. The hash function can be any suitable hash function that is capable of producing a digital signature by which a receiver can verify the integrity of the data received from the transmitter. For example, the hash function can be a one-way hash function, such as MD5. The hash function can be more or less computationally intensive than MD5 to facilitate the high-speed flow of data from the transmitter across the network boundary or to increase security, as desired. It should be understood that although optional steps 512 and 514 are shown in a parallel fashion, they can be performed in series (one after the other), and one or both can be omitted, as desired or required for the specific implementation of the transmitter.

As shown in FIG. 11, the data transmitted by the transmitter in step 504 can be repeated 516 any number of desired times. For example, according to an embodiment of the invention, the transmitter can repeat transmission of at least a portion of the data signal (e.g., each data packet, a group of data packets, etc.), a desired number of times. In this manner, the receiver can compare the repeated transmissions of each transmitted portion of the data signal to determine the accuracy of each portion transmitted. For example, if the data portion to be repeated is a data packet, and it is repeated three times, the receiver can compare the three received packets to determine the packet intended to be transmitted by the transmitter by accepting as correct the data packet that has been most closely repeated by another received data packet, and discarding the non-matching data packet. If each data packet, or a group of data packets, is only repeated twice (e.g., to conserve bandwidth), then the receiver could compare each received data packet, or group of data packets, with it's respective checksum to determine which data packet is correct, and which has been corrupted and should be discarded. It will be understood that a variety of repeating techniques can be used by the transmitter (and a corresponding variety of comparing techniques can be used by the receiver) according to one or more embodiments of the invention, depending upon the design constraints or requirements for the transmitter and/or the system within which it is used.

Additionally, according to one or more embodiments of the invention, the transmitter can transmit a pulse, such as a periodic pulse signal, in optional step 518. This pulse can serve as an indicator to a receiver that the transmitter is functioning properly and/or that the conduit from the transmitter to the receiver has not been compromised. For example, if a periodic pulse is transmitted in optional step 518 by the transmitter, the receiver will know if that pulse is interrupted that there is a problem either with the transmitter, the conduit between the transmitter and the receiver, and/or the single physical connection (e.g., an optical fiber) over which the conduit is established.

Figure 12:
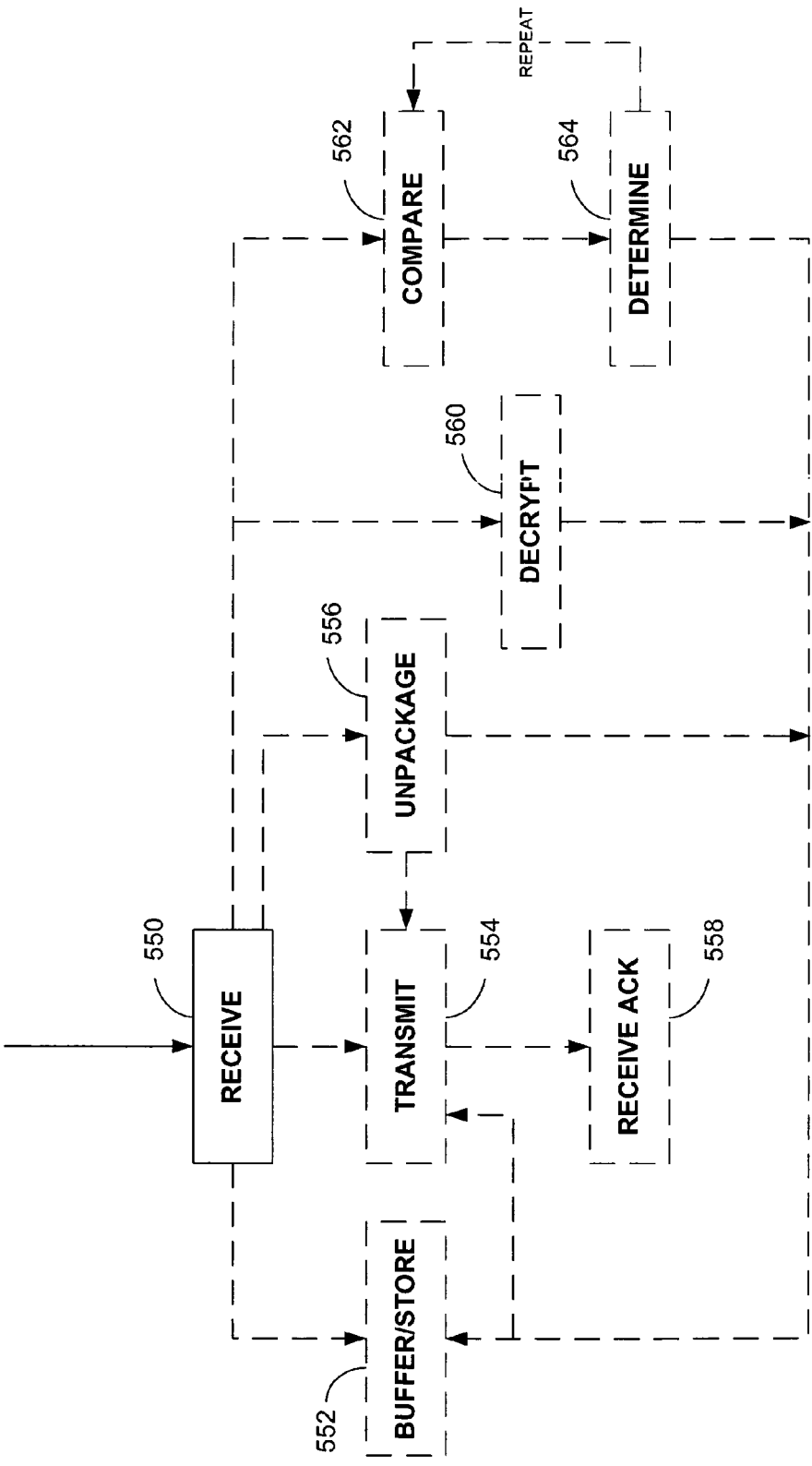
FIG. 12 is a flow diagram illustrating steps implemented by a receiver according to an embodiment of the invention.

FIG. 12 is a flow diagram illustrating steps implemented by a receiver according to an embodiment of the invention. According to one or more embodiments of the invention, the receiver, whose operation is shown and described in connection with FIG. 12, can receive signals via a one-way conduit from the transmitter, whose operation is shown and described in connection with FIG. 11. As mentioned above, however, it will be appreciated that either the transmitter or the receiver can be connected to a device different from the devices described in FIG. 11 and FIG. 12. For example, a unidirectional transmitter can function as shown in FIG. 11 with a receiver that is also capable of transmitting data while still maintaining the integrity of the one-way conduit, because the transmitter is physically incapable of receiving any signal via the unidirectional conduit. Alternately, a unidirectional receiver can function as described below in connection with FIG. 12, but receive data from a transmitter that is also capable of receiving data while still maintaining the integrity of the one-way conduit because the receiver is physically incapable of transmitting any signal via the unidirectional conduit.

The receiver receives data in step 550, which, according to one or more embodiments of the invention, can be data from a unidirectional transmitter transmitting according to the technique shown and described in connection with FIG. 11. Because the receiver is only connected to a device outside of its network (i.e., across a network boundary) using unidirectional conduit over a single physical connection, and because the receiver is incapable of transmitting data via the conduit, it is not possible for data to be inadvertently transmitted outside of the network within which the receiver resides.

The receiver, according to one or more embodiments of the invention, can operate in a "push" mode, where the receiver actively transmits the received data to one or more devices within the network of the receiver, or in a "pull" mode, where the receiver stores the received data to be subsequently retrieved by one or more devices within the network of the receiver. While the receiver is operating in the "pull" mode, the data received in step 550 can be stored, or buffered, in optional step 552. One or more devices connected to and within the same network as the receiver can retrieve data stored, or buffered, in optional step 552. According to one or more embodiments of the invention, for example, the stored data can be retrieved by devices at pre-determined and/or periodic intervals. Additionally or alternatively, the data stored, or buffered, in optional step 552 can be retrieved by one or more devices on an as-needed or "just-in-time" basis.

When the receiver is operating in the "push" mode, the data received in step 550 can be transmitted to one or more devices connected to and within the same network as the receiver in optional step 554. As mentioned above, the data received in step 550 can be in a protocol that is different from the protocol used within the network of the receiver. For example, the receiver can use a bidirectional protocol (e.g., TCP, etc.), and the data received in step 550 can be packaged according to a unidirectional protocol (e.g., UDP, etc.). Accordingly, after the data is received in step 550, it can optionally be unpackaged in step 556 prior to being either transmitted to (in optional step 554) or retrieved after storage (in optional step 552) by a device within the same network as the receiver. Said another way, the data received in step 550 can be translated back into a protocol used within the network of the receiver (e.g., TCP, etc.). Of course, as discussed above, one or more embodiments allow the communications carried over the conduit to be in the same protocol that devices within the network of the receiver (and/or the transmitter) use to communicate.

According to one or more embodiments of the invention, when the receiver operates in the "push" mode, it transmits data to a device within the network of the receiver. This data can, for example, be transmitted within by the receiver to a device within the network of the receiver using a bidirectional protocol in optional step 554. Using the bidirectional protocol, the device to which the data is transmitted in optional step 554 may transmit an acknowledgement signal (ACK), which can optionally be received by the receiver in optional step 558. The receiver can, according to one or more embodiments of the invention, store the acknowledgement (ACK) signal in a buffer or other storage component for retrieval by one or more devices within the network of the receiver. For example, an SNMP trap can be used to report the status of the receiver, and to report ACK signals received by the receiver, among other information.

According to one or more embodiments of the invention, the data received in step 550 can be encrypted, repeated, and/or can include additional information, such as a digital signature, checksum, and/or digital certificate. To handle data that is encrypted, the receiver can optionally decrypt, in optional step 560, the data received in step 550. This decryption, like the encryption performed by the transmitter, can be one of a number of techniques used with public- or private-key encryption.

According to one or more embodiments of the inventions, where at least a portion of the data signal (e.g., one or more data packets) received in step 550 by the receiver is repeated, the receiver can optionally perform a comparison of the multiple received portions in optional step 562. The receiver can, for example, use information from the comparison performed in optional step 562, to determine in optional step 564 if the integrity of the received data has been preserved (e.g., by comparing at least a portion of the data against a corresponding checksum or digital signature). Additionally, the source of the data can be determined to be valid in optional step 564 if a received digital signature is verified and its corresponding digital certificate is compared in optional step 562 with and matches one or more acceptable sources (e.g., if the identity of the digital certificate matches one or more acceptable senders).

Additionally or alternatively, the comparison in optional step 562 can be used to compare multiple repeated portions of a data signal to each other, and the determination can be made in optional step 564 of which portion was correctly sent. This can be accomplished, for example, by selecting the version of the portion of data that is most accurately copied in another version of the portion of data, and by discarding the version(s) of the portion of data that is significantly different from the other versions of the portion of data (e.g., the majority of similar portions indicates the correct portion and the outlier is discarded). For example if a portion of the data signal received in step 550 is repeated three times, the receiver can compare, in optional step 562, the three versions of the portion of the data signal. If it is determined in optional step 564 that two versions of the portion of the data signal are the same, or substantially similar, and the third version of the portion of the data signal is substantially dissimilar from the other two, the third version can be discarded and the data signal can be correctly received as including the data of the two substantially similar versions of the portion of the data signal. Of course, more repeats of a single portion of the data signal can be made, in which case the comparison would be similar to the technique described above.

In cases where two versions of a portion are substantially similar, but not the same, a second comparison, such as a comparison of each version of the portion with a corresponding digital signature or checksum, may be necessary to determine the version of the portion of the data signal that was correctly transmitted. In such cases, the optional steps of comparing 562 and determining 564 can be repeated, as needed, and can be used to compare different parameters of the same portions of the data signal. Moreover, the optional steps of comparing 562 and determining can be repeated, as needed or desired, for each of the portions of the data signal received in step 550 (e.g., for each repeated data packet or group of repeated data packets).

Figure 13:
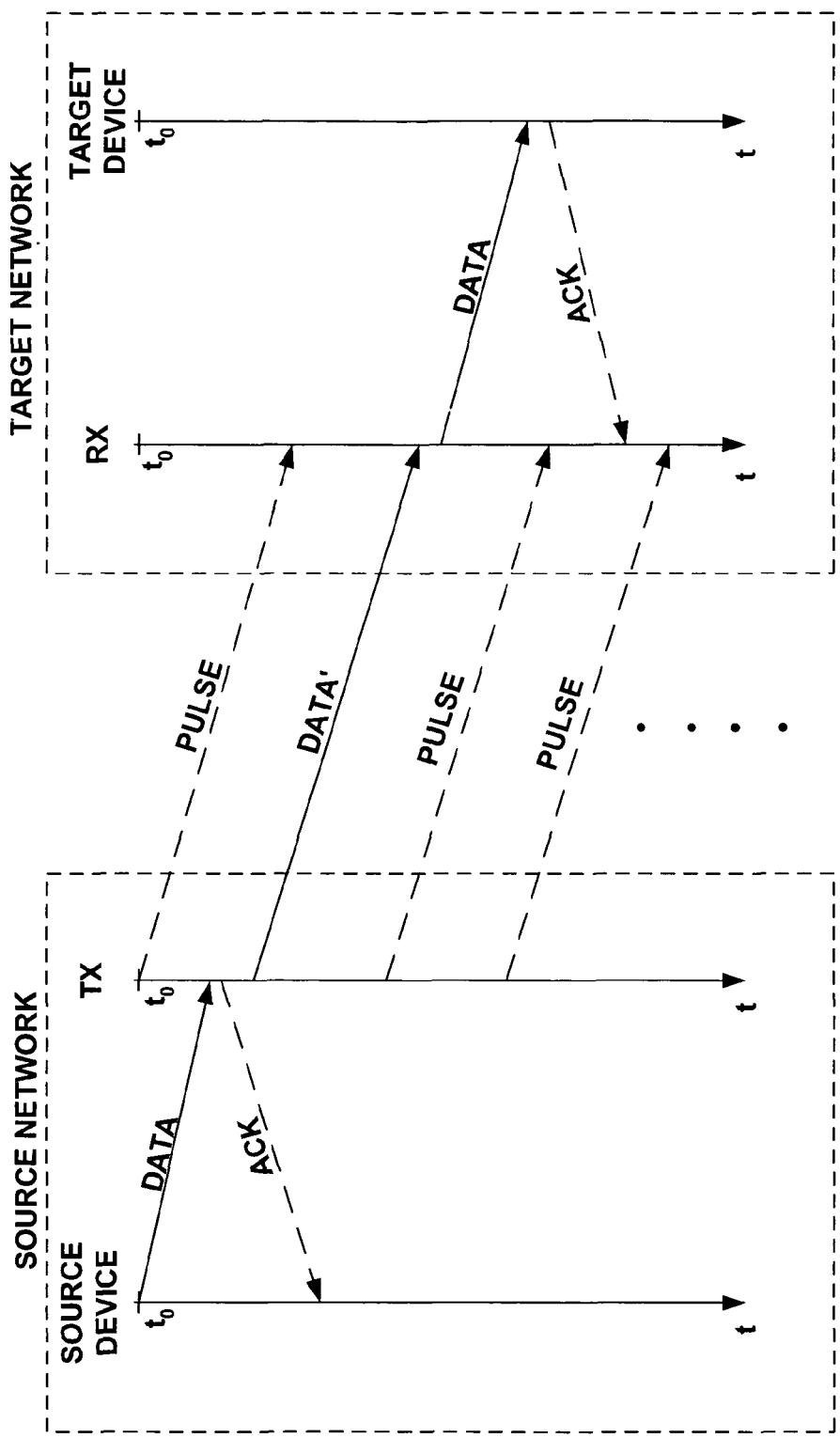
FIG. 13 is a flow diagram illustrating data signals used in a one-way transmission of data according to an embodiment of the invention.

FIG. 13 is a flow diagram illustrating data signals used in a one-way transmission of data according to an embodiment of the invention. In FIG. 13, two networks, a source network and a target network are shown. In the source network, a source device and a transmitter (designated TX) are shown. In the target network, a receiver (designated RX) and a target device are shown. Various signals are shown being transmitted between the devices of FIG. 13. Beneath each device is a timeline, showing the flow of time with respect to the various signals shown in the figure.

The scenario illustrated in FIG. 13 begins at time to, when the source device within the source network transmits a data signal (designated DATA) intended for the target device within the target network. Because the source network has only a single point of contact for transmitting data across the source network's security boundary (the transmitter), the data is intercepted by the transmitter. The transmitter optionally can send an acknowledgement signal (designated ACK) to the source device, acknowledging receipt of the data signal. This can be accomplished either with the source device being aware of the transmitter or transparently to the source device. For example, in cases where the data is sent by the source device using a bidirectional protocol (e.g., TCP, etc.), and the transmitter is transparent to the source device, the acknowledgement signal can be provided to the source device as if the data signal was received by and acknowledged by the target device.

After whatever processing time is necessary, the transmitter transmits the data to the receiver in the target network. It should be understood that, although multiple signals are shown between the transmitter and the receiver, each of those signals is carried via a conduit formed on a single physical connection, such as an optical fiber. Additionally, it should be understood that, although a source network and target network are specified as finite networks in FIG. 13, one of the networks can include a large public network, such as the Internet, depending upon which network is the trusted network seeking to limit the flow of data, and depending on the desired direction of data flow to or from that network.

As shown in FIG. 13, a periodic pulse signal (designated PULSE) can optionally be transmitted via the conduit from the transmitter to the receiver at regular intervals. As described above, the receiver can monitor the integrity of the conduit by receiving the periodic pulse. If the pulse is not received, or is significantly degraded, the receiver can determine (and possibly provide an alert, or log an alert entry in a memory table) that there is a problem with the transmitter, the conduit between the transmitter and the receiver, and/or the single physical connection over which the conduit is carried. Thus, as shown in FIG. 13, a pulse signal can be transmitted at regular intervals whenever the transmitter is not transmitting a data signal.

After receiving the data signal from the source device, the transmitter can optionally repackage the data by performing encryption algorithms on the data, changing the protocol of the data, repeating the data, performing a hash function on the data (adding a digital signature to the data), transmitting a checksum of the data, and/or performing any other desired operation on the data. Thus, the signal carrying the data transmitted by the transmitter is a modified data signal (designated DATA'), which is received and interpreted by the receiver. The receiver can unpackage the modified data signal by performing a companion (possibly inverse) operation or set of operations on the modified data signal. Once the receiver has unpackaged the modified data signal, it is able to transmit the original data signal to the target device, as intended by the source device.

The target device can optionally transmit an acknowledgement signal (designated ACK) of proper receipt of the data signal. This may occur, for example, in embodiments where the target network uses a bidirectional protocol for communication between the various devices of that network. The acknowledgement signal can be stored in a buffer, for example, and can be maintained for record keeping purposes. Additionally, the acknowledgement signals ACK stored by the receiver can be retrieved by one or more devices within the target network if necessary or desired.

It should be understood that the data signals shown in FIG. 13 can be repeatedly transmitted in the manner shown in that figure. Likewise, the data signal can represent a single data packet or group of data packets (e.g., several repeated data packets), which form only a portion of the entire data signal to be communicated from the source device to the target device. Accordingly, after the acknowledgement signal ACK is received by the source device, it can transmit the next portion of the data signal, and the same process described above can be repeated to transmit the next portion of the data signal from the source device to the target device in a secure one-way transmission of the data.

From the foregoing, it can be seen that the invention provides a method and system for providing secure one-way transfer of data. As described above, one or more embodiments of the invention are described in the context of a unidirectional transmitter and/or receiver capable of establishing a unidirectional conduit with another unidirectional device, or with a bidirectional device. Some specific embodiments have been described in the context of networks that use a bidirectional communication protocol (e.g., TCP) communicating via a unidirectional conduit carried over a single physical connection (e.g., an optical fiber) using a one-way protocol (e.g., UDP).

It will be appreciated by those skilled in the art, however, that the invention can be embodied in other specific forms without departing from the spirit or essential characteristics thereof. For example, while some specific embodiments described above include the use of two different protocols, a single protocol (e.g., UDP, IP, etc.) can be used to achieve a secure, one-way transfer of data according to the principles of the invention described above. Moreover, although embodiments have been described using a single physical connection across a network boundary, multiple one-way, or unidirectional, conduits can be established using multiple physical connections across a network boundary. Additionally, multiple conduits can be combined on the same physical connection using one or more know combining techniques, such as wavelength division multiplexing (WDM), frequency division multiplexing (FDM), time division multiplexing (TDM), or other combining techniques. Furthermore, although embodiments of the invention have been described in connection with various hardware and software components, such components can be interchanged where desired.

The presently disclosed embodiments are, therefore, considered in all respects to be illustrative and not restrictive.

What is claimed is:

1. A method comprising:
    receiving data, via a transmitter, from a first network device in a first network, the data intended for a second network device in a second network;
    transmitting, via the transmitter and to the first network device, information indicating receipt of the data on behalf of the second network device; and
    forwarding, via the transmitter, the data to the second network device.

2. The method of claim 1 wherein the transmitter is transparent to the first network device and the second network device.

3. The method of claim 1 wherein the transmitter is located in the first network.

4. The method of claim 1 wherein the transmitter is incapable of receiving data from the second network.

5. The method of claim 1 wherein the receiving includes:
    receiving the data via a first protocol, and
    wherein the forwarding includes:
        forwarding the data via a second, different protocol.

6. The method of claim 1 further comprising:
    encrypting the data prior to forwarding the data to the second network device.

7. The method of claim 1 further comprising:
    performing a hash function on the data prior to forwarding the data to the second network device.

8. The method of claim 1 further comprising:
    resending, via the transmitter, at least a portion of the data to the second network device a predetermined number of times.

9. The method of claim 1 wherein the forwarding includes:
    sending at least one of a digital signature, a checksum, or a digital certificate with the data to the second network device.

10. A system comprising:
    a transmitter configured to:
        receive a packet from a first network device in a first network, the packet intended for a second network device in a second network,
        transmit, to the first network device, information indicating receipt of the packet on behalf of the second network device, and
        forward the packet to the second network device.

11. The system of claim 10 wherein the transmitter is transparent to the first network device and the second network device.

12. The system of claim 10 wherein the transmitter is located in the first network.

13. The system of claim 10 wherein the transmitter is incapable of receiving data from the second network.

14. The system of claim 10 wherein, when receiving a packet, the transmitter is configured to:
    receive the packet via a transmission control protocol (TCP), and
    wherein, when forwarding the packet, the transmitter is configured to:
        repackage data in the packet using a user datagram protocol (UDP).

15. The system of claim 10 wherein the transmitter is further configured to:
    encrypt the packet prior to forwarding the packet to the second network device.

16. The system of claim 10 wherein the transmitter is further configured to:
    perform a hash function prior to forwarding the packet to the second network device.

17. The system of claim 10 wherein the transmitter is further configured to:
    resend the packet to the second network device a predetermined number of times.

18. The system of claim 10 wherein, when forwarding the packet, the transmitter is configured to:
    send at least one of a digital signature, a checksum, or a digital certificate with the packet to the second network device.

19. A system comprising:
    a receiver configured to:
        forward data from a first network device in a first network to a second network device in a second network,
        receive a message from the second network device acknowledging receipt of the data, the acknowledgement message being intended for the first network device, and
        store the acknowledgement message without forwarding the acknowledgement message to the first network device.

20. The system of claim 19 wherein the receiver is transparent to the first network device and the second network device.

21. The system of claim 19 wherein the receiver is located in the second network.

22. The system of claim 19 wherein the receiver is incapable of transmitting data to the first network.

23. A method comprising:
    forwarding data, via a receiver device, from a first network device in a first network to a second network device in a second network;
    receiving, via the receiver device, a message from the second network device acknowledging receipt of the data, the acknowledgement message being intended for the first network device; and storing, via the receiver device, the acknowledgement message without forwarding the acknowledgement message to the first network device.

24. The method of claim 23 wherein the receiver device is transparent to the first network device and the second network device.

25. The system of claim 23 wherein the receiver device is incapable of transmitting data to the first network.

26. A system comprising:
a transmitter configured to:
receive data from a first network device in a first network, the data intended for a second network device in a second network,
transmit, to the first network device, information indicating receipt of the data on behalf of the second network device, and
forward the data toward the second network device; and
a receiver configured to:
receive the data from the transmitter,
forward the data to the second network device,
receive a message from the second network device acknowledging receipt of the data, the acknowledgement message being intended for the first network device, and
store the acknowledgement message without forwarding the acknowledgement message to the first network device.

27. The system of claim 26 wherein the transmitter is located in the first network and the receiver is located in the second network.

28. The system of claim 26 wherein the transmitter and the receiver are transparent to the first network device and the second network device.

29. The system of claim 26 wherein the transmitter is incapable of receiving data from the receiver and the receiver is incapable of transmitting data to the transmitter.

* * * * *